United States Patent

Nishimura et al.

[11] Patent Number: 5,012,271
[45] Date of Patent: Apr. 30, 1991

[54] EXPOSURE CONTROL DEVICE

[75] Inventors: Akimasa Nishimura, Kanagawa; Shigeo Ogura, Tokyo; Ryosuke Miyamoto, Kanagawa; Nobuo Tezuka, Kanagawa; Nobuo Fukushima, Kanagawa, all of Japan

[73] Assignee: Canon Kabushiki Kaisha, Tokyo, Japan

[21] Appl. No.: 523,262

[22] Filed: May 14, 1990

Related U.S. Application Data

[63] Continuation of Ser. No. 165,739, Mar. 9, 1988, abandoned.

[30] Foreign Application Priority Data

Mar. 12, 1987 [JP] Japan .................. 62-057353
Mar. 12, 1987 [JP] Japan .................. 62-057354
Mar. 25, 1987 [JP] Japan .................. 62-070928

[51] Int. Cl.$^5$ .................................. G03B 7/08
[52] U.S. Cl. ........................ 354/456; 352/141; 358/228; 354/429
[58] Field of Search ............... 352/141, 169; 358/228, 358/909; 354/429, 430, 432, 270, 234.1, 235.1, 250, 261, 264, 265

[56] References Cited

U.S. PATENT DOCUMENTS

| 4,183,635 | 1/1980 | Dorig ..................... | 352/141 |
| 4,558,368 | 12/1985 | Aoki et al. ............. | 352/141 |
| 4,689,689 | 8/1987 | Saito et al. ............ | 358/228 |
| 4,734,777 | 3/1988 | Okino et al. .......... | 354/270 |
| 4,746,949 | 5/1988 | Takei et al. ........... | 352/169 |
| 4,746,988 | 5/1988 | Nutting et al. ........ | 358/228 |

FOREIGN PATENT DOCUMENTS 0032484 2/1985 Japan .

Primary Examiner—Russell E. Adams
Attorney, Agent, or Firm—Robin, Blecker, Daley & Driscoll

[57] ABSTRACT

An exposure control device having exposure control means arranged to vary a charging method thereof according to the selection of a continuous shooting mode or a non-continuous shooting mode. With the exposure control means including at least a shutter, the shutter is arranged to be moved to a less degree in the continuous shooting mode than in the non-continuous shooting mode. After completion of continuous shooting, the shutter moving degree is changed to a degree to which the shutter is to be moved in the non-continuous shooting mode.

12 Claims, 22 Drawing Sheets

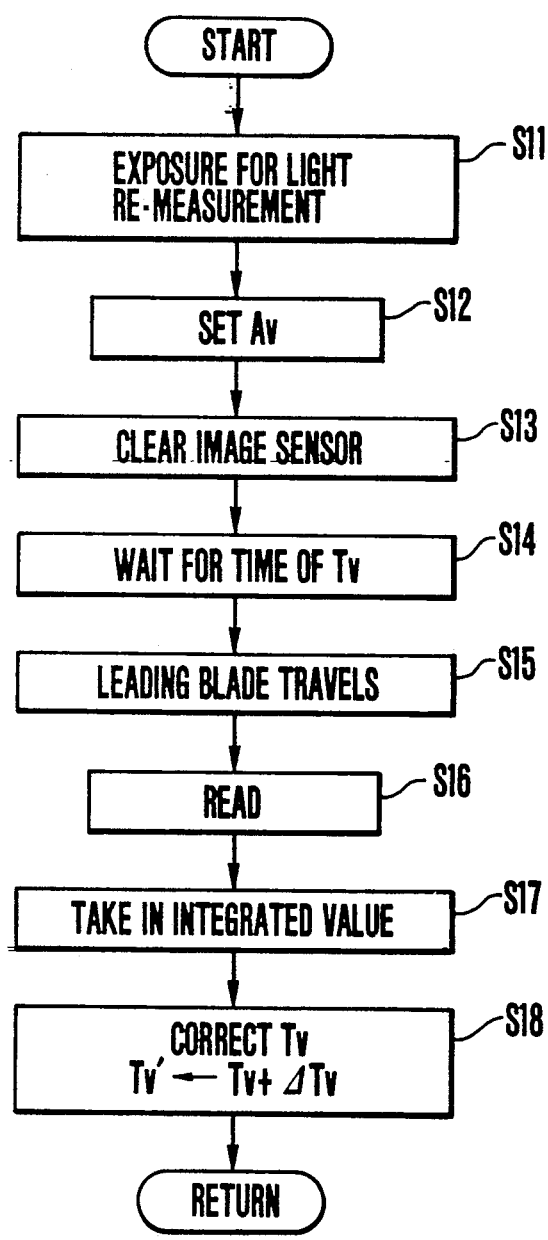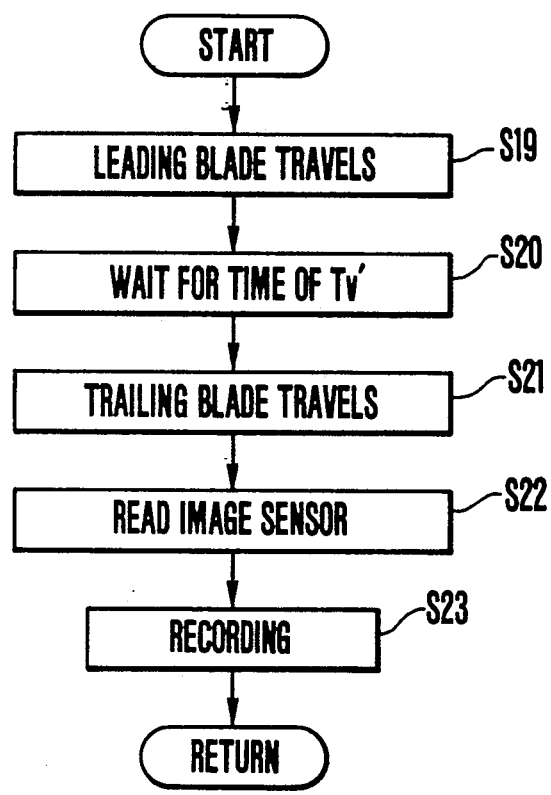

REVERSE ROTATION CHARGE ROUTINE

FORWARD ROTATION CHARGE ROUTINE

EXPOSURE CONTROL DEVICE

This application is a continuation of application Ser. No. 165,739, filed Mar. 9, 1988, now abandoned.

BACKGROUND OF THE INVENTION

1. Field of the Invention

This invention relates to an exposure control device of an electronic still video camera using an image sensor such as a CCD or the like.

2. Description of the Related Art

An electronic still video camera which is arranged to record one field or one frame portion of a still image signal on a magnetic disc or the like by means of an image sensor such as a CCD has been known. In the electronic still video camera of the kind having the above stated image sensor, however, it has been difficult to expose the image sensor to an apposite amount of light either due to a difference in sensitivity characteristic between a light measuring element which is provided for obtaining exposure information and the image sensor which is provided for sensing the image of an object or due to the narrowness of the dynamic range of the image sensor.

To solve the above stated problem, a method has been proposed, for example, as disclosed in Japanese Patent Application Laid-Open No. SHO 59-104867 or SHO 60-32484. In accordance with this method, a preliminary shot is first tentatively performed with the image sensor according to the exposure conditions obtained by the light measuring element, and then conditions for a real exposure are computed on the basis of an image signal obtained by the image sensor.

However, although an apposite degree of exposure is obtainable by this method, it necessitates a complex arrangement for a shutter operation. More specifically, at least a part of the shutter must be left open for the preliminary exposure in carrying out the light re-measurement prior to the real exposure. This also necessitates a considerable length of time before a picture is obtained after the shutter release operation on the camera. In the case of a continuous shooting mode, therefore, the shooting speed lowers. Further, the necessity of the preliminary exposure for every light re-measuring action requires an additional shutter charging energy, which is a great disadvantage for a compact camera having a limited power source capacity.

Besides, in the event of continuous shooting, the prior art method which requires readjustment of the the exposure condition for every shot, as mentioned in the foregoing, results in a prolonged interval between one shot and another.

SUMMARY OF THE INVENTION

This invention aims at the solution of the above stated problems of the prior art described in the foregoing. It is therefore an object of the invention to provide an exposure control device which is arranged to allow the preliminary exposure to be made for light re-measurement only for a first frame in the case of continuous shooting and to allow the real exposures to be made without light measurement for the ensuing frames.

It is another object of the invention to provide a shutter which is capable of operating at a high degree of precision without requiring many parts and is thus arranged to solve the above stated problems.

To attain this object, an embodiment of this invention is provided with a charging system which is capable of charging applicable parts for a whole exposure process including the exposure for light re-measurement and another charging system which is arranged to charge the parts required for the real exposure. In addition to the charging systems, the embodiment is provided also with means for ensuring that an exposure can be made for light re-measurement without fail after completion of a series of continuous shooting actions.

Another embodiment of the invention is arranged to minimize a shutter release time lag. For this purpose, the embodiment is provided with bound suppressing means for forcedly suppressing the armature of an electromagnet from bouncing by means of a clamp device which is provided for locking shutter blades.

Further, to attain the above stated objects, an image sensing device embodying this invention is arranged as follows: The first shot of continuous shooting is made in the same manner as in the prior art example mentioned in the foregoing by tentatively controlling the light receiving state of the image sensor thereof on the basis of the output of a photo-sensitive light receiving element which is provided separately from the image sensor. Then, the output of the image sensor is taken out under this control. After that, the light receiving state is readjusted as necessary on the basis of the output of the image sensor for shooting. The degree of the readjustment which is made in this manner is stored. The second and ensuing shots in the continuous shooting are arranged to be performed under the control of exposure control means arranged to control the exposure with a value which deviates as much as the stored readjustment degree from the exposure control degree which has been first obtained on the basis of the output of the photo-sensitive light receiving element.

In accordance with the above stated arrangement, the second and ensuing shots are controlled with a value deviating as much as the stored readjustment degree from the output of the photo-sensitive element. The embodiment thus obviates the necessity of performing the preliminary exposure process before a next shot. Therefore, a time interval between one shot and another can be shortened. Further, any light measurement error attributable to a dynamic range difference between the image sensor and the photosensitive light receiving element is adequately corrected, so that continuous shooting can be accomplished under accurate exposure control.

The above and other objects and features of the invention will become apparent from the following detailed description of embodiments thereof taken in conjunction with the accompanying drawings.

BRIEF DESCRIPTION OF THE DRAWINGS

FIG. 9 is a flow chart showing a an exposure routine for light re-measurement.

FIG. 10 is a flow chart showing a real exposure routine.

FIGS. 16A to 16D show a shutter device arranged according to this invention as a third embodiment thereof. Of these drawings, FIGS. 16A to 16C correspond to FIGS. 15A to 15C respectively, while FIG. 16D shows the whole surface of an image sensor 1 as in a state of being shielded from light.

DETAILED DESCRIPTION OF THE PREFERRED EMBODIMENTS

Figure 1:
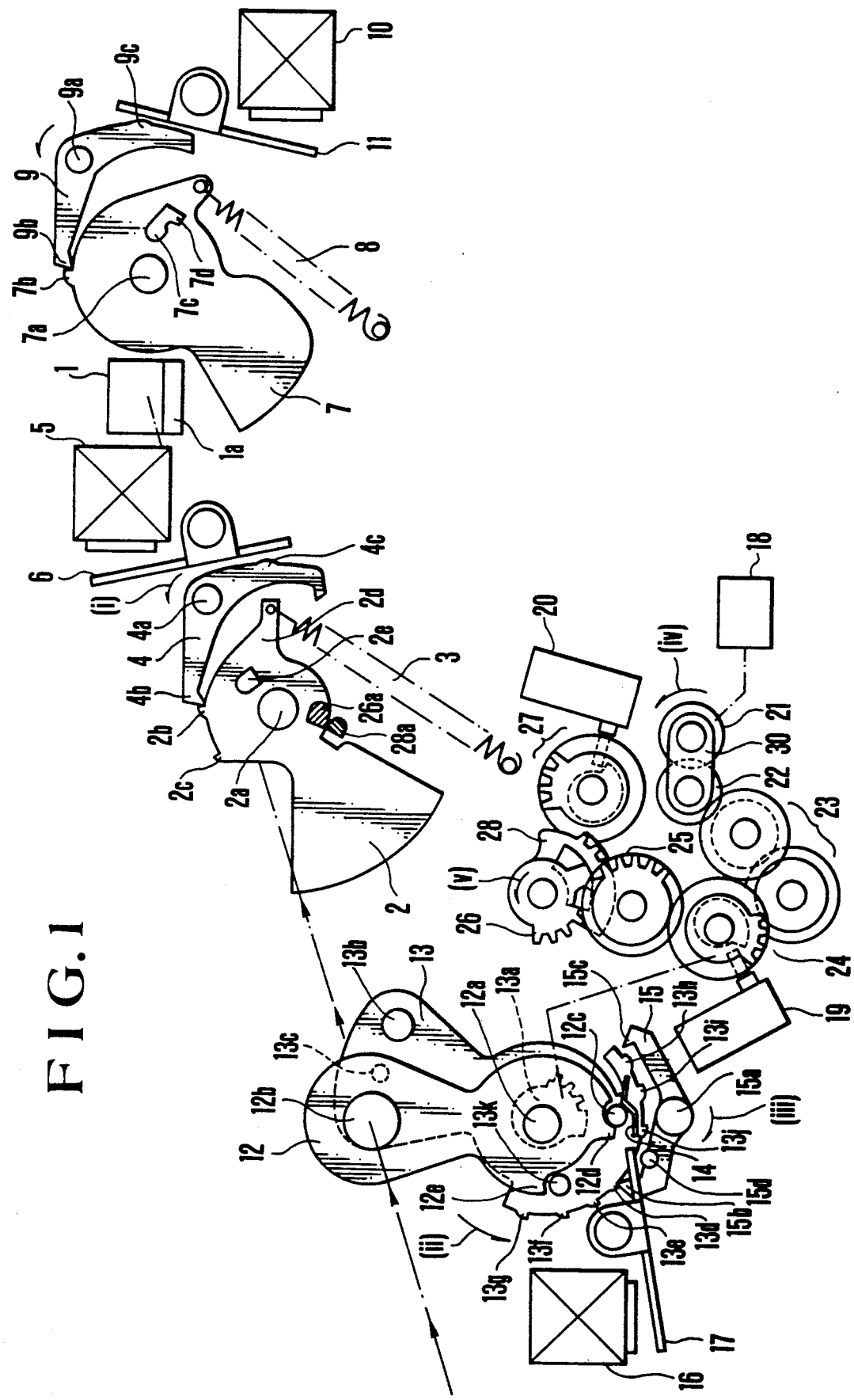
FIG. 1 shows the shutter, diaphragm and charging members of an embodiment of this invention as in a fully charged state for an exposure for light re-measurement.

FIG. 1 shows the essential parts of an exposure control device arranged according to this invention as an embodiment thereof. The device is shown as in a state of having been charged to be ready for a whole exposure process including an exposure for light re-measurement. Referring to FIG. 1, the illustration includes an image sensor 1 which is a CCD or the like; and a leading shutter blade 2. The leading shutter blade 2 is urged by a spring 3 to turn round clockwise on a shaft 2a. A leading blade clamp 4 is arranged to be urged by a spring which is not shown to turn round on a shaft 4a in the direction of arrow (i). In the state as shown in FIG. 1, the leading blad clamp 4 has its fore end hook part 4b engaging a hook part 2b of the leading blade 2.

An electromagnet 5 for controlling the leading shutter blade 2 is arranged to pull an armature 6 when a driving pulse is applied thereto by a driving circuit which is not shown. With the armature 6 pulled by the electromagnet 5, a protrudent part 4c of the leading blade clamp 4 is pushed by one end of the armature 6 to disengage thereby the hook parts 4b and 2b from each other. A trailing shutter blade 7 is urged by a spring 8 to turn round also clockwise on a shaft 7a. The trailing shutter blade 7 is arranged in conjunction with a trailing blade clamp 9; an electromagnet 10 for controlling the trailing blade 7; and an armature 11 of the electromagnet 10. These members 7 to 10 are arranged to operate in the same manner as the above stated members 2 to 5.

Under the condition as shown in FIG. 1, the trailing shutter blade 7 is in a position of being completely retracted away from the optical path of the image sensor 1. The leading shutter blade 2 is in a position of shielding from light the lower part (hatched part) 1a of the image sensor 1.

Diaphragm blades 12 and 13 are arranged to be turnable on a shaft 12a respectively. The diaphragm blade 13 is urged by a spring which is not shown to turn round in the direction of arrow (ii). These blades 12 and 13 are provided with apertures 12b, 13b and 13c which correspond to given aperture values respectively. In the case of FIG. 1, the aperture 12b is located within the photo taking optical path though the image sensor 1 is shielded from light by the diaphragm blade 13.

A cutaway segment gear 13a is arranged in one unified body with the diaphragm blade 13 and to be able to engage another segment gear 24 which will be described later. The diaphragm blade 13 is provided with hook parts 13d to 13j and also has a pin 13k erected thereon. The diaphragm blade 12 is provided with a pin 12c which is arranged to be normally in contact with a leaf spring 14 for keeping the diaphragm blade 12 in the illustrated state.

An aperture setting lever 15 is urged to turn round in the direction of arrow (iii) by a spring which is not shown. The lever 15 is provided with a hooked end part 15b which is arranged to be able to engage the hook parts 13d to 13g of the diaphragm blade 13 and another hooked end part 15c which is arranged to be able to engage other hook parts 13h to 13j of the blade 13. Under the condition as shown in FIG. 1, the hook part 15b engages the hook part 13d. The diaphragm blades are arranged in conjunction with an aperture controlling electromagnet 16 which is provided with an armature 17.

When driving pulses are applied to the electromagnet 16, the armature 17 causes the above stated aperture setting lever 15 to turn round counterclockwise via a pin 15d which is erected on the lever 15. This disengages the hook part 15b from the hook part 13d of the diaphragm blade 13. The instant the hook parts are disengaged, the diaphragm blade 13 is turned round a little in the direction of arrow (ii) by the force of the spring which is not shown. However, this time, the hook part 15c of the aperture setting lever 15 comes to engage the hook part 13h of the blade 13.

Next, the instant the electromagnet 16 is released from the driving pulses, the aperture setting lever 15 is turned round in the direction of arrow (iii) by the spring force to disengage the hook parts 15c and 13h from each other. Following that, the hook parts 15b and 13e come to engage each other. At a phase thus obtained, the diaphragm aperture 13c is located within the photo taking optical path. (In this specific embodiment, the diameters of the diaphragm apertures 12b, 13b and 13c are arranged to be in a relation of 12b>13b>13c). In this instance, the aperture value is set at a value defined by the aperture 13c. With the driving pulses further applied to the electromagnet 16 one after another, the hook parts 15b and 13f engage each other to bring the aperture value to a value defined by the aperture 13b; and then the hook parts 15b and 13g engage each other to have the diaphragm blade 13 retracted to the outside of the optical path and the aperture value set at a value defined by the aperture 12b. When the driving pulse is still further applied to the electromagnet 16, the pin 13k which is erected on the diaphragm blade 13 comes to abut on a recessed end part 12d of the diaphragm blade 12. This causes both the diaphragm blades to turn round in the direction of arrow (ii) until they are thus retracted to the outside of the optical path. Then, the aperture value reaches a maximum aperture value.

A charge motor 18 is arranged to be rotatable both forward and backward and to have its rotation force transmitted to a gear 21. Gears 21 and 22 are arranged to jointly form a so-called planetary clutch. When the gear 21 rotates in the direction of arrow (iv), the gear 22 engages a gear 23. The gear 22 engages another gear 27 when the gear 21 rotates in the direction reverse to the direction of arrow (iv).

With the gear 21 rotated in the direction of arrow (iv), the gear arrangement operates as follows: In this case, the rotating force of the motor 18 is transmitted in the order of gears 21 - 22 - 23 - 24 -25. The gear 24 comprises a toothed part which is arranged to engage the gear 23, a segment gear part which is arranged to engage the above stated segment gear 13a provided on the diaphragm blade 13, and a switch driving cam part. A switch 19 is arranged to be caused by the cam part to generate a signal indicative of completion of one turn of the gear 24. With the gear 24 having made one turn, the shutter blades 2 and 7 and the diaphragm blades 12 and 13 are charged into a state as shown in FIG. 1.

The gear 25 comprises a toothed part which is arranged to engage the gear 24 and a segment gear part which is arranged to engage a shutter charging segment gear 26. The gear 25 completes one turn when the gear 24 makes one turn. In this case, the segment gear 26 is arranged to rotate in the direction of arrow (v).

When the gear 21 rotates in the direction reverse to the direction of arrow (iv), the gear arrangement operates as follows: In that instance, the rotating force of the motor 18 is transmitted in the order of gears 21 - 22 - 27. The gear 27 is arranged in the same manner as the above stated gear 24. The gear 27 comprises a toothed part which is arranged to engage the gear 22, a cam part which is arranged to drive a switch 20 to generate a signal indicative of one turn of the gear 27, and a segment gear part which is arranged to engage a shutter charging segment gear 28 which is arranged coaxially with the above stated segment gear 26. The diaphragm is not charged as the rotating force is not transmitted to the gear 23 in that instance. Further, a rotation angle relation between the shutter charging segment gears 26 and 28 is arranged to be (the rotation angle of the gear 26) >(the rotation angle of the gear 28).

Figure 2:
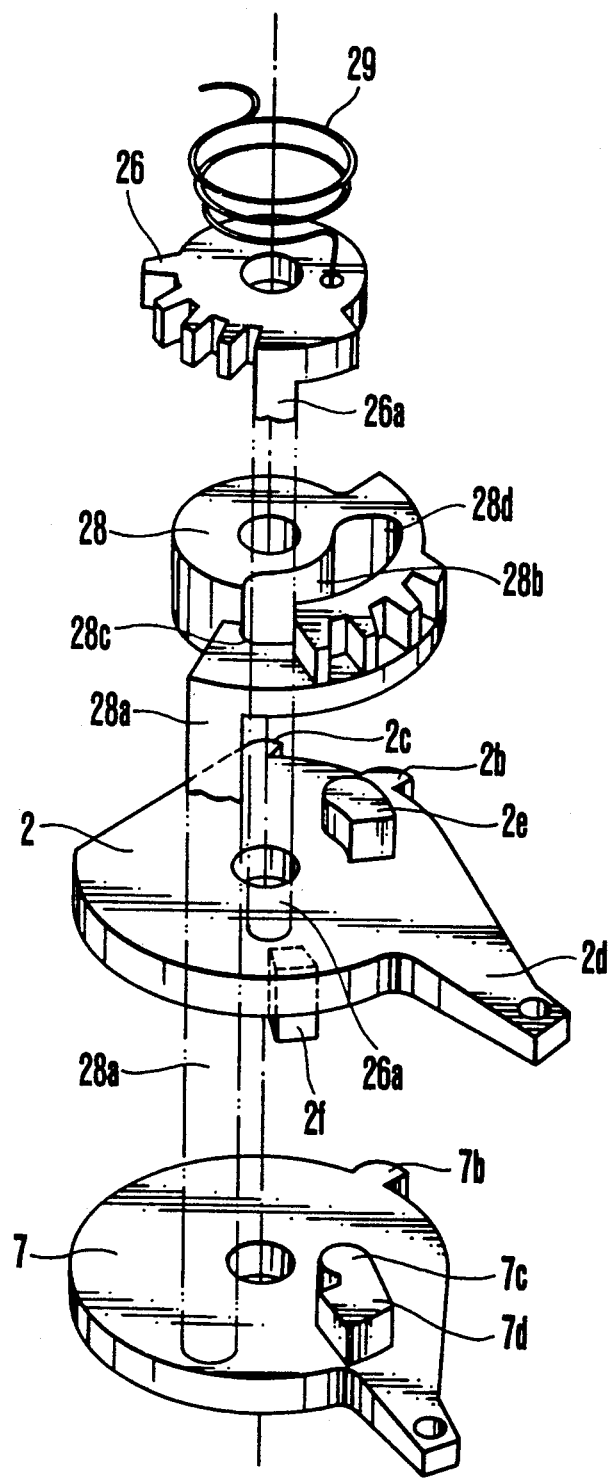
FIG. 2 is an exploded oblique view showing a shutter charging part of FIG. 1.

Referring to FIG. 2, the relation of the segment gears of the shutter charging part to the shutter blades is as follows: FIG. 2 is an exploded oblique view showing the shutter charging segment gear part. In FIG. 2, the same parts as those shown in FIG. 1 are indicated by the same reference numerals. The segment gears 26 and 28 and the leading and trailing shutter blades 2 and 7 are coaxially arranged. A spring 29 is arranged to impart a clockwise returning force to the segment gear 26. The segment gear 26 which is arranged to be driven by the gear 25 mentioned in the foregoing is provided with a shutter charging pin 26a. The pin 26a extends to be near to the leading shutter blade 2 through an aperture 28b which is provided in the segment gear 28. The leading blade 2 is provided with a protrudent part 2e which is arranged to be able to contact the above stated shutter charging pin 26a and another protrudent part 2f which protrudes toward the trailing blade 7. The trailing blade 7 is also provided with protrudent parts 7c and 7d. The protrudent part 7c is arranged to be able to contact the protrudent part 2f of the leading blade 2. Meanwhile, the segment gear 28 which is arranged to be driven by the above stated segment gear 27 is provided with a shutter charging pin 28a. The pin 28a is arranged to be able to contact an arm part 2d of the leading blade 2 and the protrudent part 7d of the trailing blade 7. Each of the members shown in FIG. 2 is illustrated as on a phase corresponding to the state shown in FIG. 1.

Figure 3:
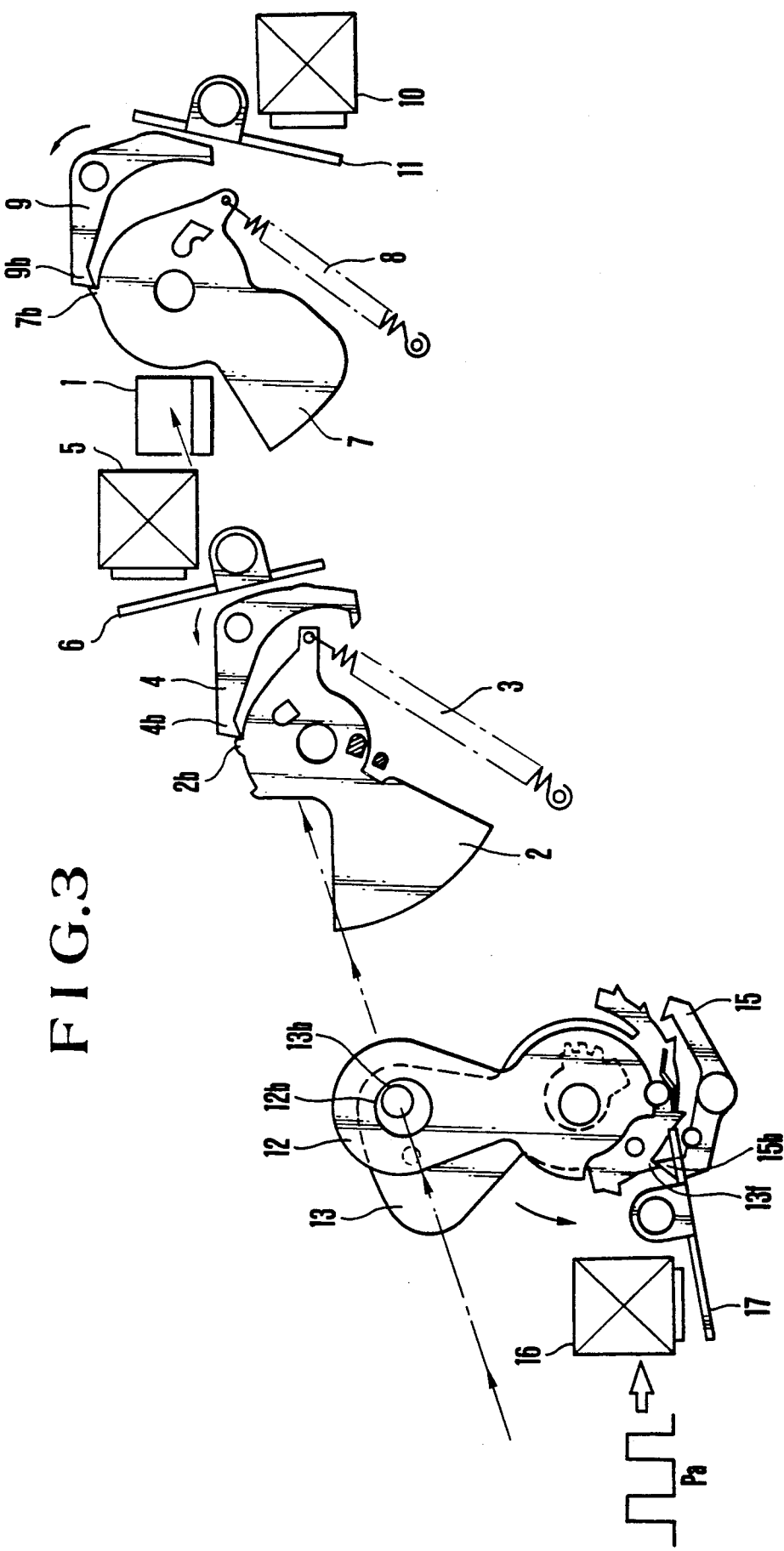
FIG. 3 shows the exposure device of FIG. 1 as in a state of effecting the exposure for light re-measurement with the diaphragm set in position.
Figure 4:
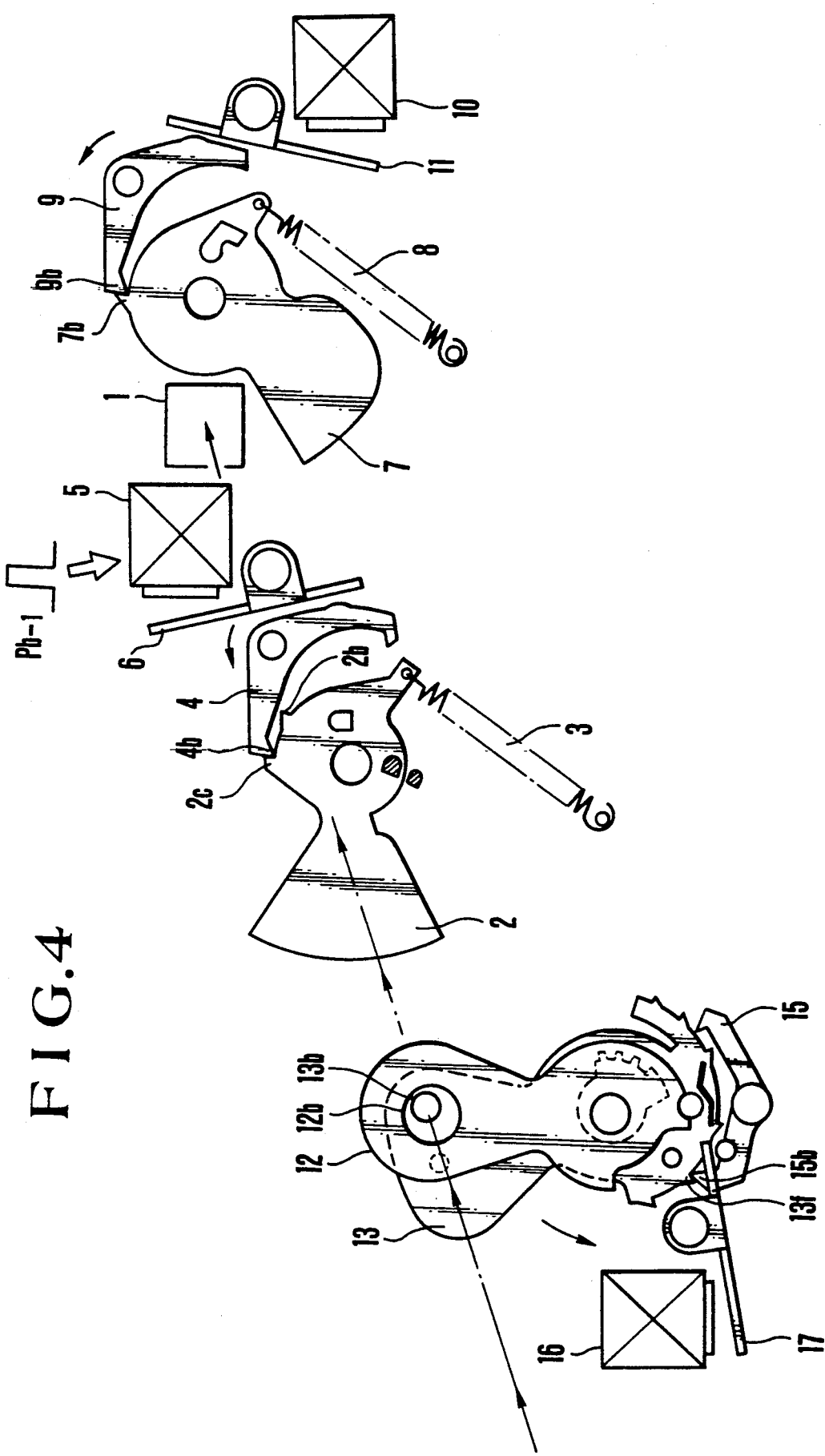
FIG. 4 shows the same embodiment as in a state before a real exposure after completion of the exposure for light re-measurement or in a state of being fully charged by a cutaway segment gear 28.

The embodiment which is arranged as described in the foregoing operates as follows: When a shooting action begins, an aperture value and a shutter time value are computed by light measuring and computing means using the output of a light measuring element which is not shown. Assuming that the computed aperture value which is thus obtained is the aperture value defined by the diaphragm aperture 13b, two driving pulses Pa are applied to the diaphragm controlling electromagnet 16. This causes the hook part 15b of the aperture setting lever 15 and the hook part 13f of the diaphragm blade 13 to engage each other. As a result, the diaphragm aperture 13b is shifted to the inside of the photo taking optical path. Then, the image of an object is allowed to be formed on the image sensor 1. FIG. 3 shows this condition. Under the condition shown in FIG. 3, accumulation time control is performed over the image sensor 1 to allow it to accumulate or integrate an electrical signal for a period of time corresponding to the above stated shutter time value. The accumulating time control is accomplished by transferring the electrical signal which is thus accumulated for a given period of time to a part shielded from light by the leading blade 2. After that, a driving pulse Pb-1 is applied to the leading blade controlling electromagnet 5. With the pulse thus applied, the hook part 2b of the leading blade 2 and the hook part 4b of the leading blade clamp 4 are disengaged from each other. This brings the leading blade 2 into a state of fully shielding the image sensor 1 from light. This state is as shown in FIG. 4. In this instance, the hook part 2c of the leading blade 2 engages the hook part 4b of the leading blade clamp 4.

Figure 5:
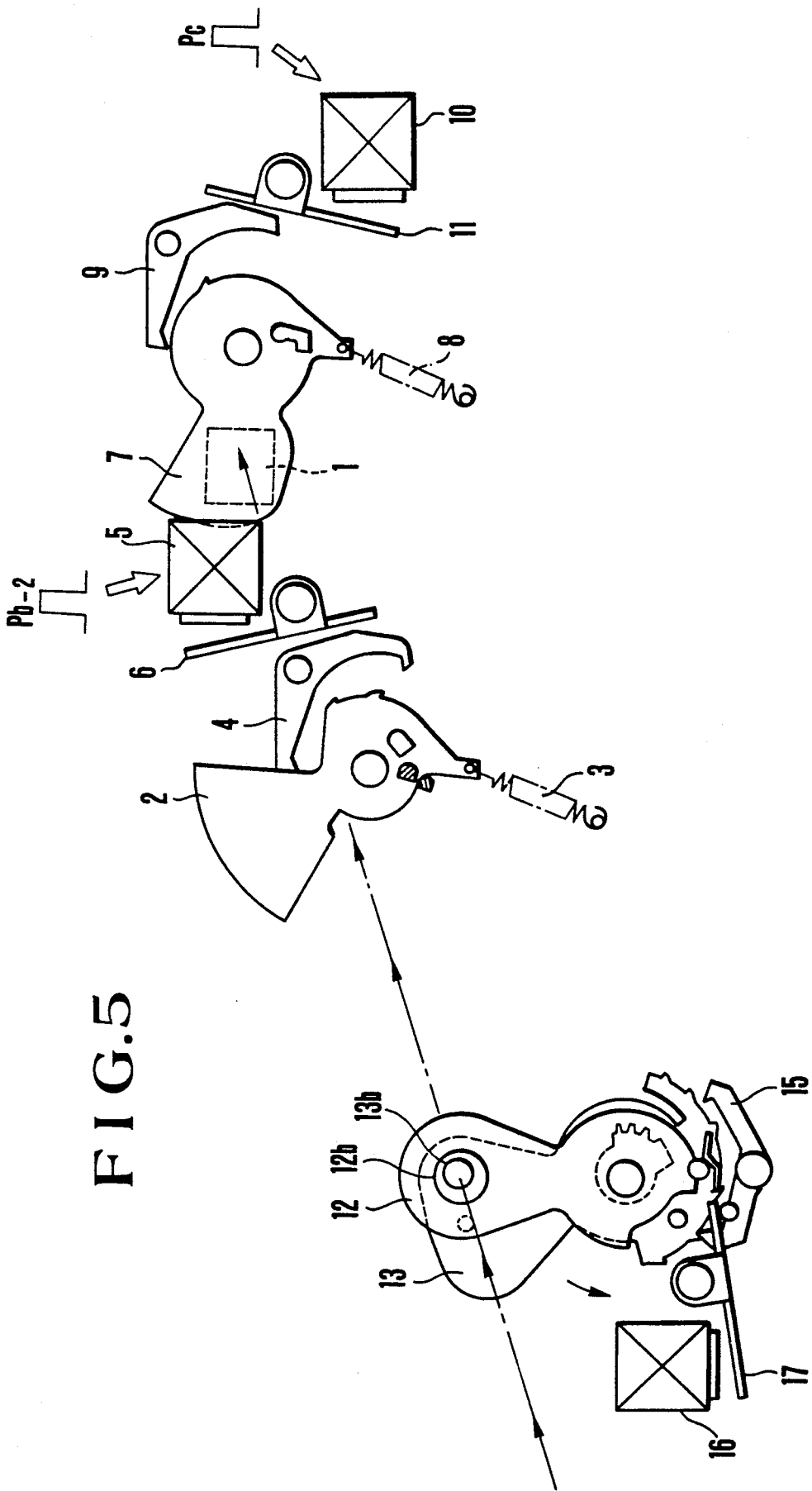
FIG. 5 shows the embodiment as in a state of having completed the real exposure.

Following this, the output of the image sensor 1 is read out. Since the information thus obtained can be regarded as accurate measured light information, the shutter time value is again computed on the basis of the measured light information. Then, driving pulses Pb-2 and Pc are applied to the leading blade controlling electromagnet 5 and the trailing blade controlling electromagnet 10 one after another on the basis of the information thus computed. Then the exposure time control is performed for the exposure of the image sensor 1, this time, by using the leading and trailing shutter blades 2 and 7. Image information thus obtained by the exposure is then read out and recorded on a recording medium which is not shown. FIG. 5 shows the two shutter blades as in a state of having completed their travels.

Figure 6:
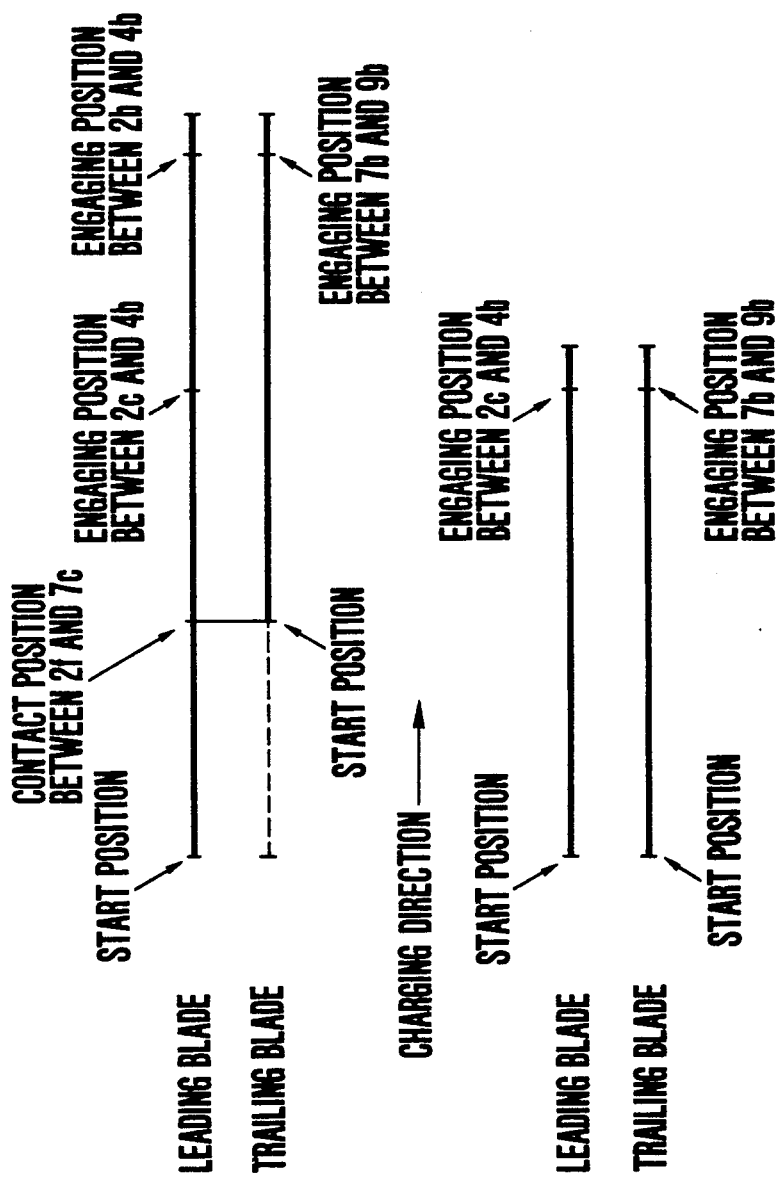
FIG. 6A shows the moving degrees of shutter blades when the shutter of FIGS. 1 to 5 is charged by a segment gear 26.
FIG. 6B shows the moving degrees of the shutter blades when the shutter is charged by the segment gear 28.

Then, if the camera is judged to be in a non-continuous shooting mode, the motor 18 rotates forward to cause the gear 21 to rotate in the direction of arrow (iv). The gears 22 and 23 then engage each other. The diaphragm blade 13 is charged by the segment gears 24 and 13a. If the other diaphragm blade 12 is also in a state of having been retracted from the photo taking optical path in that instance, the blade 12 is also moved back to its position as shown in FIG. 1 through the pin 13k of the blade 13 and one end 12e of the recessed part of the blade 12. Meanwhile, the segment gear 26 which is driven by the segment gear 25 is also rotated in the direction of arrow (v). As described in the foregoing with reference to FIG. 2, with the segment gear 26 rotatively driven, the leading shutter blade 2 is urged to turn round to the left by the shutter charging pin 26a via the protrudent part 2e of the blade 2. This in turn urges the trailing shutter blade 7 to turn round to the left via the protrudent part 2f of the blade 2 and the protrudent part 7c of the blade 7. As a result, the state of FIG. 5 is brought back to the state of FIG. 1. The relation of urging or charging degrees between the shutter blades is as shown in FIG. 6A. Further, since the opening angle of the open part 28b of the segment gear 28 (see FIG. 2) is arranged to be smaller than the rotating degree of the segment gear 26, the gear 28 eventually comes to be turned round at the time of charging by the segment gear 26. However, at the time of return of the gear 26 back to its original position, both the gears 26 and 28 are brought back to their initial positions by the force of the spring 29 with the open end part 28c and the charging pin 26a in a state of abutting on each other.

When the camera is found to be in the continuous shooting mode upon completion of an exposure as shown in FIG. 5, the motor 18 is reversely rotated to cause the gear 21 to rotate in the direction reverse to the direction of arrow (iv) (see FIG. 1). The gears 22 and 27 are thus allowed to engage each other. In this case, the segment gear 28 is rotated by the segment gear part of the gear 27. However, the diaphragm is not charged. With the segment gear 28 caused to rotate, the leading and trailing shutter blades 2 and 7 are rotatively urged by the shutter charging pin 28a via the arm part 2d of the leading blade 2 and the protrudent part 7d of the trailing blade 7 (see FIG. 2). In this instance, the open end part 28c of the segment gear 28 causes the segment gear 26 to rotate at the same time via the charging pin 26a. However, since the leading blade 2 has already been urged to begin to turn round, this causes no problem in charging the shutter. Further, since the segment gears 28 and 26 rotate together, the gear 28 is also brought back to its initial position by the force of the spring 29. FIG. 6B shows the relation of urging or charging degrees between the shutter blades. Upon completion of the charging process, there obtains the state of FIG. 4 and the camera again becomes ready for exposing the image sensor 1 to light.

When the continuous shooting operation of the camera is found to have come to an end, the motor 18 is allowed to rotate forward. The gears 22 and 23 are caused to engage each other. Then, with the series of charging actions performed, the camera comes back to the state of FIG. 1 and thus becomes ready for a next shooting operation including the exposure for light re-measurement.

Figure 7:
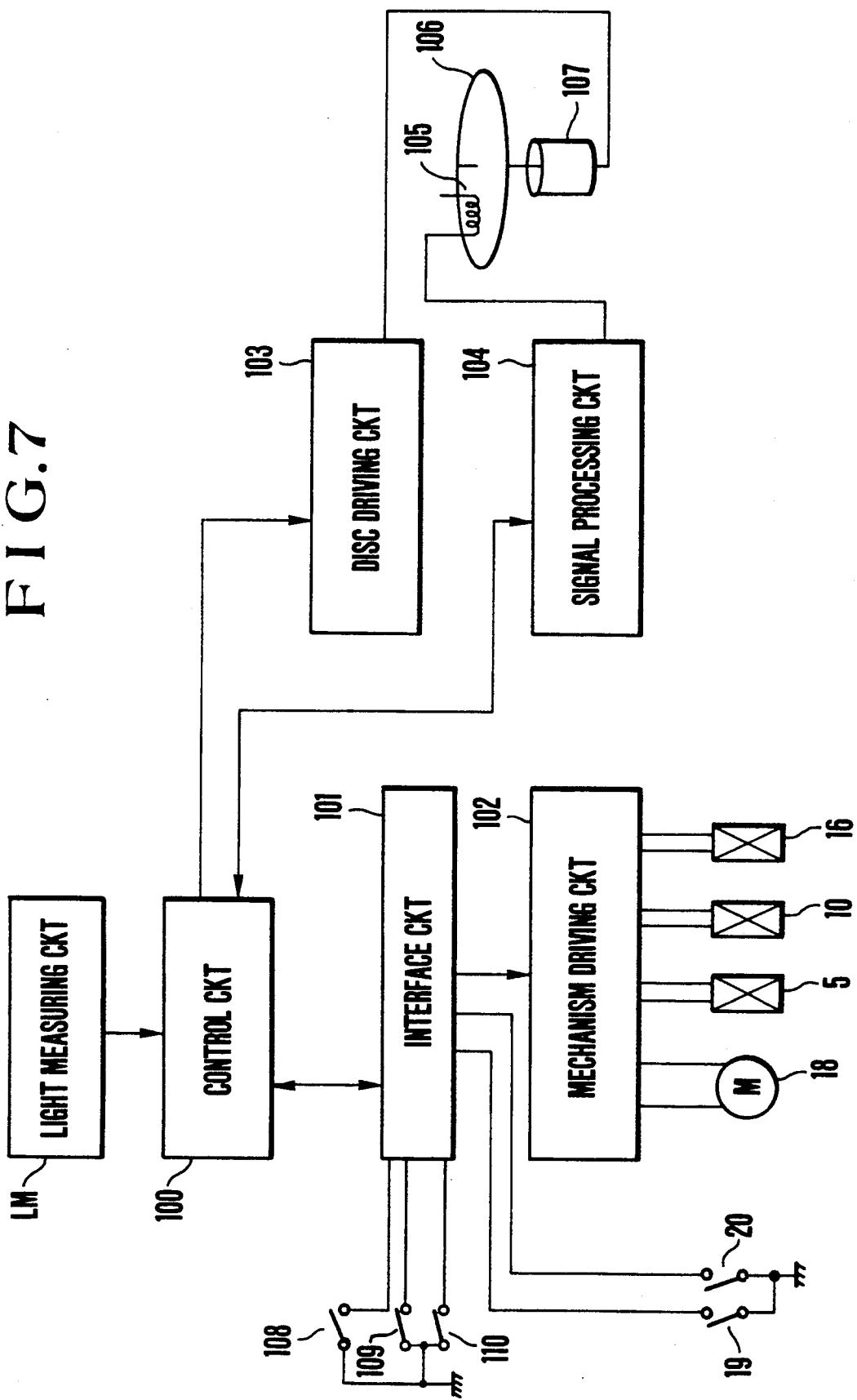
FIG. 7 is an electrical block diagram including a mechanical driving system.
Figure 8:
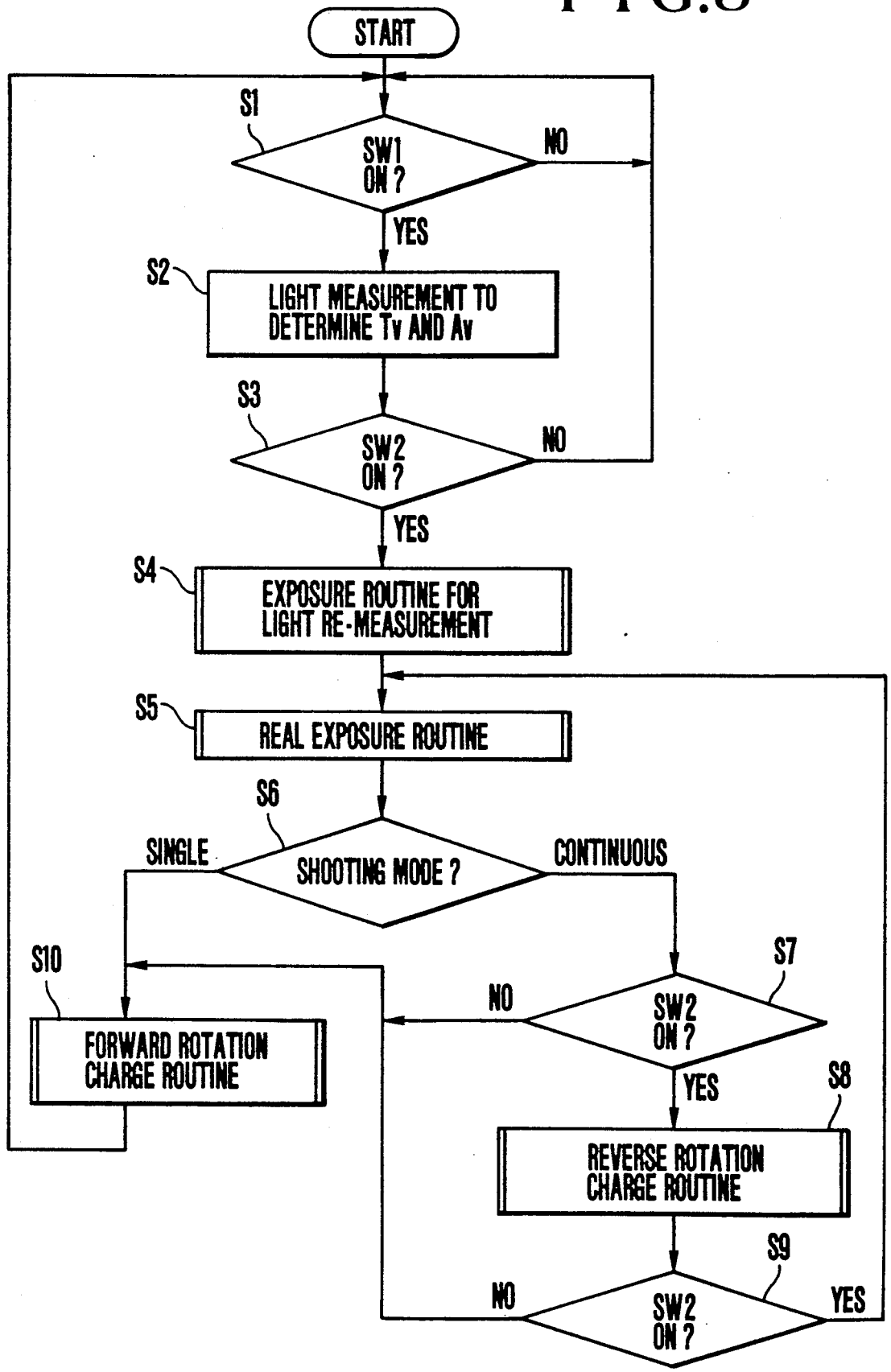
FIG. 8 is a flow chart showing the operation of the whole embodiment.

The control operation on the above stated sequence of charging actions is as described below with reference to FIGS. 8 to 11B which are flow charts along with FIG. 7 which is a block diagram of the embodiment:

Referring to FIG. 8 which shows an overall flow of the control operation, at a step S1, the control circuit 100 reads, via an interface circuit 101, the state of a switch 109 or SW1 which is a first-step switch of a two-stroke shutter release switch. If the switch 109 is found to be in its on-state, the flow of operation proceeds to a step S2. At the step S2, the control circuit 100 performs a computing operation on the output of a light measuring circuit LM which includes a light measuring element. A shutter speed (hereinafter referred to as a value TV) and an aperture value (hereinafter referred to as a value AV) are determined by the computation. The flow then proceeds to a step S3. At the step S3, a check is made for the on-state of a switch 110 or SW2 which is the second-step switch of the two-stroke release switch. Upon confirmation of the on-state of the switch SW2, the flow proceeds to a step S4, which is an exposure routine for light re-measurement. If the switch SW2 is found to be in an off-state, the flow comes back to the step S1. The exposure routine for light re-measurement is as shown in FIG. 9.

Referring to FIG. 9, at a step S11, the exposure action for light re-measurement begins. At a step S12: The value AV which is determined by the light measuring computation on the basis of the output of the light measuring circuit LM is set. In the case of this specific embodiment, the value AV is obtainable in three kinds. Therefore, the control circuit 100 sends via the interface circuit 101 to a mechanism driving circuit 102 a number of driving pulses corresponding to an apposite value AV. By this, a power supply is effected to the electromagnet 16 to have the diaphragm set at one of apertures 12b, 13c and 13b. At a step S13: The state of the image sensor 1 is cleared to make it ready for an exposure for light re-measurement. Upon completion of the clearing action, an accumulating action for light re-measurement immediately begins. A waiting time corresponding to the value TV which has been determined is taken to allow an accumulating or integrating action to be carried out at a step S14. Step S15: After expiration of the waiting time, the leading shutter blade 2 is allowed to travel with the electromagnet 5 energized by sending a driving pulse from the control circuit 100 via the interface circuit 101 and the mechanism driving circuit 102. Under this condition, the shutter shifts from a half open state to a full open state. Step S16: Lines of a video signal are read out with unnecessary lines discarded. Step S17: The read-out video signal is integrated at a signal processing circuit 104 and is then taken into the control circuit 100. The control circuit 100 makes a discrimination as to whether the computed value TV which is obtained on the basis of the output of the light measuring circuit LM is to be corrected or not, according to the level of the integrated value. If the value TV is found to be corrected, the shutter speed is set at a corrected value TV' at a next step S18. Then, the exposure routine for light re-measurement comes to an end. The flow of operation comes back to the main routine which is shown in FIG. 8.

With an exposure for light re-measurement having been completed at the step S4, the flow of operation proceeds to a step S5 for a real exposure.

Referring to FIG. 10, the real exposure routine is executed in the following manner: At a step S19: The electromagnet 5 is energized by sending a driving pulse from the control circuit 100 via the interface circuit 101 and the mechanism driving circuit 102. This causes the leading shutter blade 2 to travel. At a step S20: The flow waits for a period of time corresponding to the corrected shutter speed value TV' in case that the shutter speed value has been corrected at the step S4 or to the shutter speed value of TV if the shutter speed value has not been corrected. At a step S21: Upon expiration of the waiting time, the electromagnet 10 is energized with a driving pulse sent thereto from the control circuit 100 via the interface circuit 101 and the mechanism driving circuit 102. This causes the trailing shutter blade 7 to travel and thus brings the exposure to an end. At a step S22: The signal processing circuit 104 performs signal reading from the image sensor 1. At a step S23: The signal thus read out is recorded on a recording disc 106 via a magnetic recording head 105.

Figure 11B:
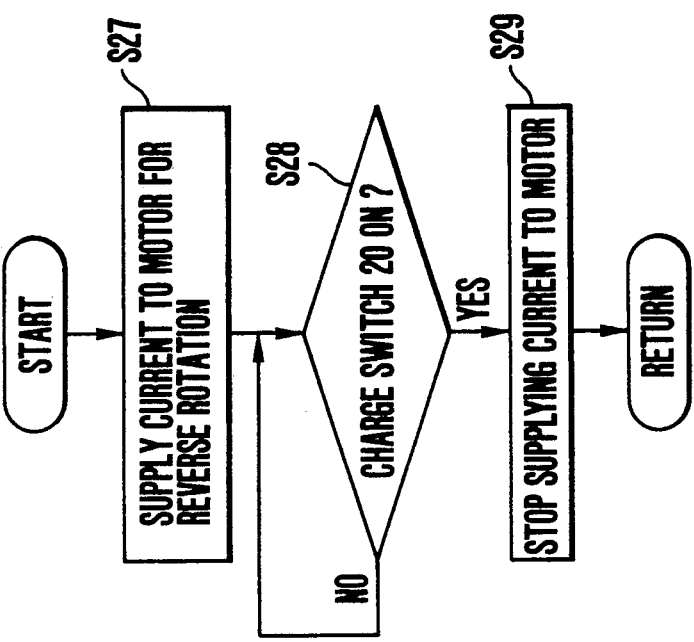
FIG. 11B is a flow chart showing a reverse rotation charge routine.
Figure 11A:
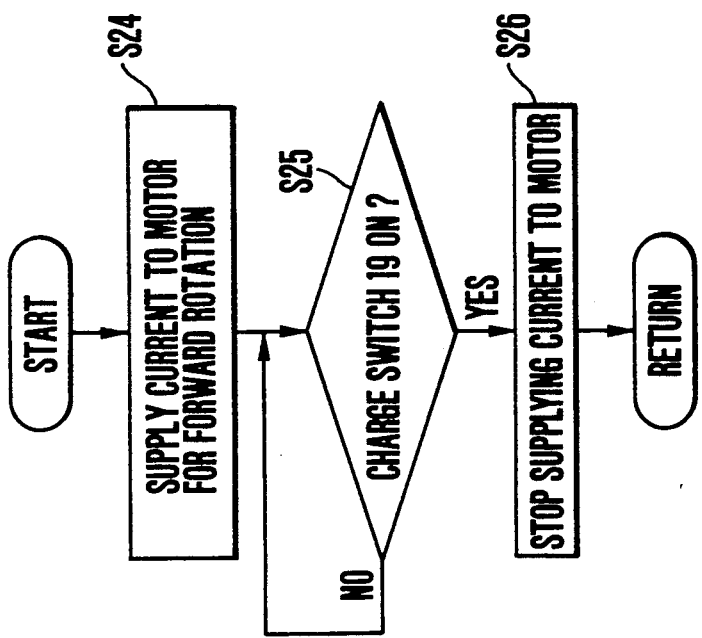
FIG. 11A is a flow chart showing a forward rotation charge routine.

The real exposure routine then comes to an end and the flow of operation comes back to the overall routine of FIG. 8. With the step S5 completed, a check is made for the shooting mode employed at a step S6. Then, the control circuit 100 reads the state of a shooting mode selection switch 108 via the interface circuit 101. If the shooting mode selected is a single shooting mode, the flow of operation jumps to a step S10 for forward rotation charge routine. The forward rotation charge routine is as shown in FIg. 11A. Referring to FIG. 11A, at a step S24, the control circuit 100 causes the motor 18 to rotate forward through the interface circuit 101 and the mechanism driving circuit 102. Then, at a step S25, the control circuit 100 checks the state of a charging switch 19 through the interface circuit 101. At a step S26: If the charging switch 19 is found to be in its on-state at the step S25, the control circuit 100 brings a current supply to the motor 18 to an end through the interface circuit 101 and the mechanism driving circuit 102. Then, the forward rotation charge routine of the step S10 comes to an end and the flow comes back to the step S1.

If the camera is found to be in the continuous shooting mode at the step S6, the flow proceeds to a step S7. At the step S7: A check is made for the state of the second step switch 110 or SW2. If the switch SW2 is found to be in its off-state, the continuous shooting is considered to have come to a pause and the forward charge routine of the step S10 is executed. If the switch SW2 is found to be in its on-state, the continuous shooting is considered to be still in process and the flow proceeds to the reverse rotation charge routine of a step S8. Further, in view of the possibility of chattering or the like, it is preferable either to prevent the chattering by a circuit means or to repeat the checking action of the step S7 several times. Referring now to FIG. 11B, the reverse rotation charge routine is as follows: At a step S27: The control circuit 100 causes the motor 18 to reversely rotate through the interface circuit 101 and the mechanism driving circuit 102. At a step S28: The control circuit 100 makes a check through the interface circuit 101 for the state of a charging switch 20. If the switch 20 is found to be in its on-state, the flow comes to a step S29. At the step 29: The control circuit 100 brings the current supply to the motor 18 to a stop through the interface circuit 101 and the mechanism driving circuit 102. Then, the reverse rotation charge routine of the step S8 comes to an end and the flow proceeds to a step S9. At the step S9: A check is made for the state of the switch 110 in the same manner as in the case of the step S7. If the switch 110 is found to be in its on-state, the flow comes to the real exposure routine of the step S5 for a next shot. If not, the operator or the photographer is considered to have no intention of further doing the continuous shooting and the flow comes to the forward rotation charge routine of the step S10. In order to prevent a possible faulty action, it is important to repeat the check for the state of the switch 110 several times at the step S9.

The sequence of actions for continuous and single shooting operations are as described in the foregoing with reference to FIG. 8. As apparent from the foregoing, the embodiment of this invention is capable of accurately performing an apposite exposure action on the image sensor, because the real exposure is made after an exposure for light re-measurement for the first frame in carrying out continuous shooting. The embodiment is also capable of carrying out the continuous shooting at a high speed, because it is arranged to minimize the time required for the real exposure. Further, the embodiment is advantageous for a camera having a power source of a limited capacity, because it requires a less amount of energy consumption for continuous shooting.

Next, the details of the shutter device of the same embodiment of this invention are described with reference to FIGS. 12A to 12D as follows: In the case of this embodiment, as mentioned in the foregoing, the exposure for light re-measurement is performed with clamping effected at the first hook part 2b. The shutter is then brought into a light shielding state with the clamp 4 shifted to the next hook part 2c by sending a pulse to the electromagnet. After that, the real exposure is allowed to begin by applying a next energizing pulse to the electromagnet. In this instance, the armature is preferably kept completely still for the precision of the exposure. However, the armature is moved by the first pulse and bounces by abutting on a member which is provided for keeping the armature in its initial position. Therefore, a period of time required before the armature comes to stand still tends to cause a release time lag. To solve this problem by minimizing the bounce of the armature, the positioning member is made of a rubber or the like. Therefore, the vibrations and the bounce of the armature are lessened for a shorter length of armature stilling time.

Figure 12A:
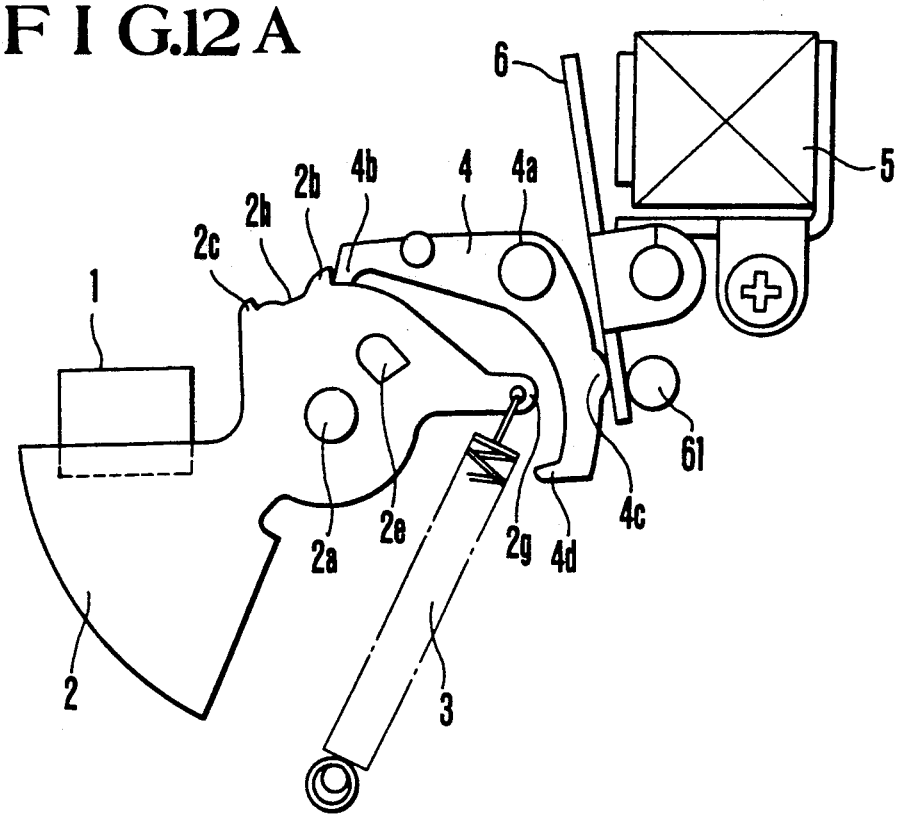
FIGS. 12A to 12D show in sequence the details of the operation of the shutter blade driving device of the embodiment up to a point immediately before a real exposure is initiated by a leading shutter blade.

FIG. 12A shows the details of the leading shutter blade 2 of FIG. 1. The illustration includes a recessed part 2h which is located between the hook parts 2b and 2c; and a member 61 which is provided for defining and keeping the initial position of the armature 6 of the electromagnet 5 and is made of a vibration absorbing material such as a rubber material.

There is provided a clearance in between the protrudent part 4c of the clamp 4 and the armature 6 for the purpose of allowing the armature to freely travel a distance corresponding to the clearance when it is pulled by the energization of the electromagnet 5. This enables the armature to disengage at once the leading blade 2 from the clamp 4 by abutting on the clamp 4 with a sufficient force of inertia. The arrangement enhances the crispness of operation of the shutter.

Figure 12B:
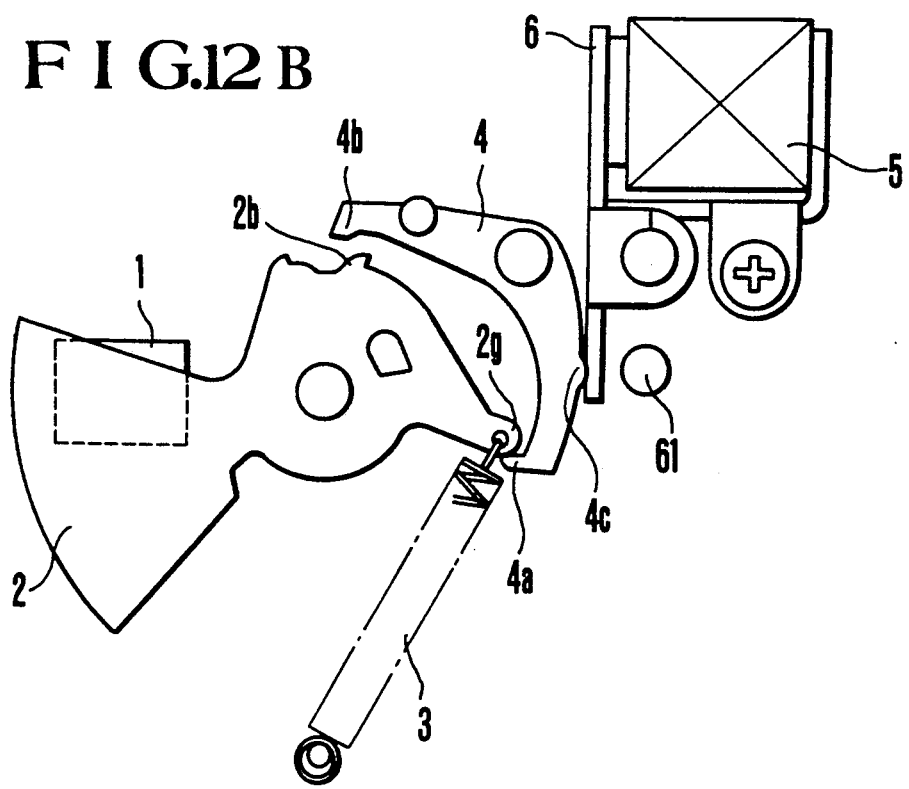
Figure 12C:
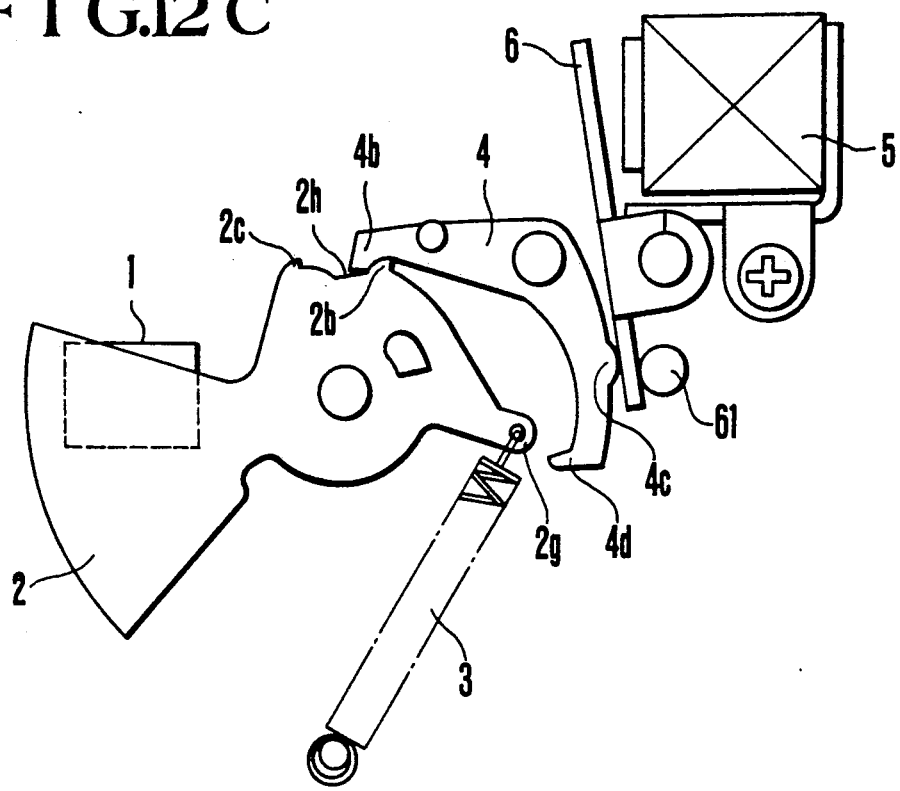

When the preliminary exposure for light re-measurement has been completed under the condition as shown in FIG. 12A, the electromagnet 5 is energized. This causes the armature 6 to kick off the protrudent part 4c of the clamp 4. Then, the hook part 4b of the clamp 4 and the hook part 2b of the leading shutter blade 2 disengage from each other. The leading blade 2 is then turned round clockwise by the force of the spring 3. The clockwise movement of the blade 2 causes the spring attaching part 2g of the blade 2 to abut on the hook part 4d which is located on the opposite side of the clamp 4. As a result, the leading shutter blade 2 makes a pause in a state as shown in FIG. 12B Upon completion of energization of the electromagnet 5, the armature 6 is turned round clockwise by its own urging means which is not shown until it comes to abut on the position defining member 61. Following this, the clamp 4 also turns round to the left. In the case of the conventional arrangement, the problem of bounce takes place when the armature comes to the member 61 and the bounce results in a prolonged stilling time. Whereas, in the case of this embodiment, the hook part 4b which is urged to move counterclockwise by an urging means (not shown) comes into the recessed part 2h provided between the hook parts 2b and 2c of the leading shutter blade 2. This allows the clamp lever 4 to turn round counterclockwise further than its position shown in FIg. 12A. Then, as shown in FIG. 12C, the protrudent part 4c of the clamp 4 comes to abut on the armature 6 to push thereby the armature 6 into a space between the part 4c and the member 61. This arrangement effectively prevents the armature 6 from bouncing.

Figure 12D:
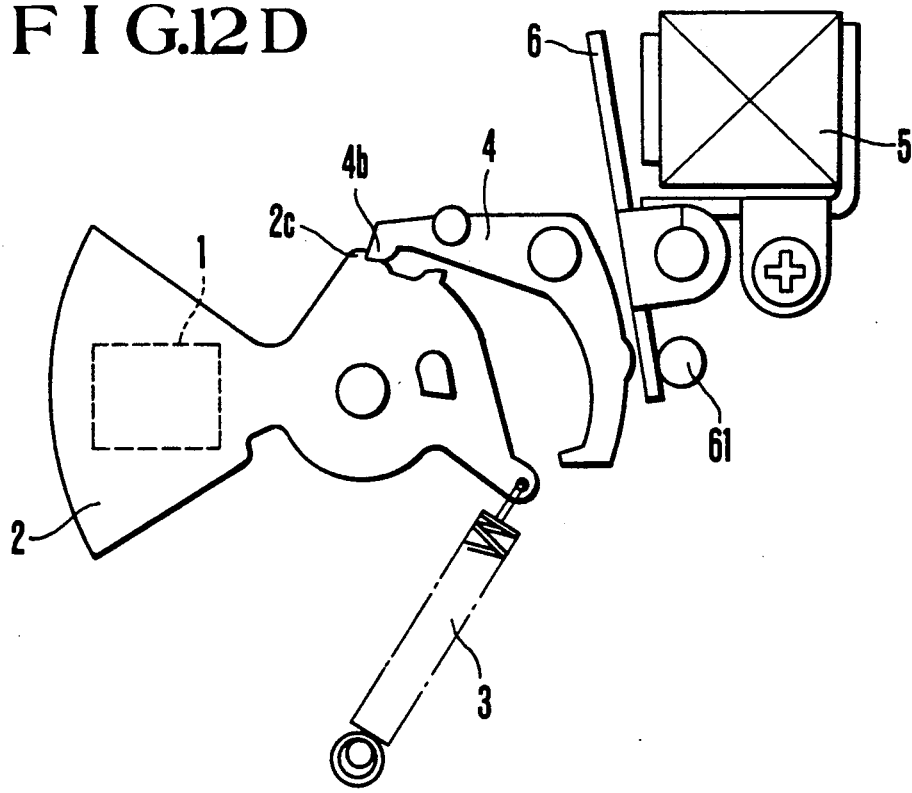

Since the hook part 2g of the leading blade 2 and the hook part 4d of the clamp 4 are disengaged from each other, the leading blade 2 is allowed to turn round further clockwise. Then, the next hook part 2c of the leading blade 2 comes to engage the hook part 4d of the clamp 4. Under that condition, the image sensor 1 is shielded from light as shown in FIG. 12D and a sequence of processes prior to the real exposure comes to an end.

As mentioned above, the embodiment is arranged to have the armature 6 forcedly held by the clamp 4. The arrangement effectively prevents the armature from bouncing when it comes back to its initial position so that the release time lag can be lessened to a great degree without recourse to additional parts for that purpose.

Figure 13:
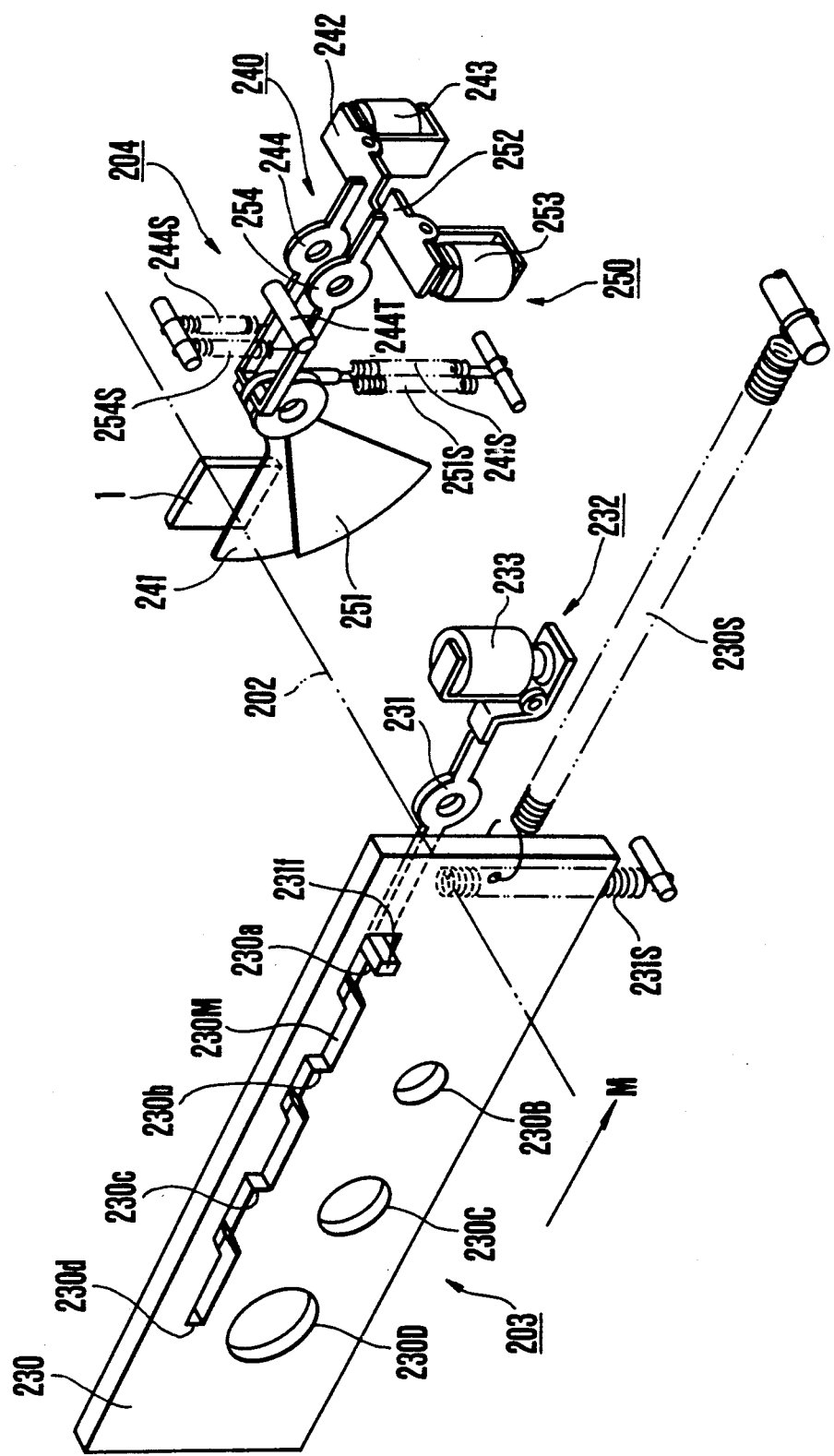
FIG. 13 is an oblique view showing a second embodiment of the invention including a diaphragm device and a shutter device thereof.

A second embodiment of this invention will be next described with reference to drawings. To begin with, the mechanical arrangement of the second embodiment is described as follows: FIG. 13 is an oblique view showing the diaphragm device and the shutter device of the second embodiment. The illustration includes a CCD 1 which is employed as an image sensor; an optical axis 202; a diaphragm device 203; and a shutter device 204. The illustration represents the initial state of the second embodiment before shooting. In this state, a light flux coming along the optical axis 202 toward the image sensor 1 is blocked by a diaphragm plate 230. In addition to this, about 30% of the image sensor 1 in the lower part thereof is shielded from light by a part of the leading blade 241 of a focal plane shutter which consists of leading and trailing shutter blades 241 and 251.

Figure 14:
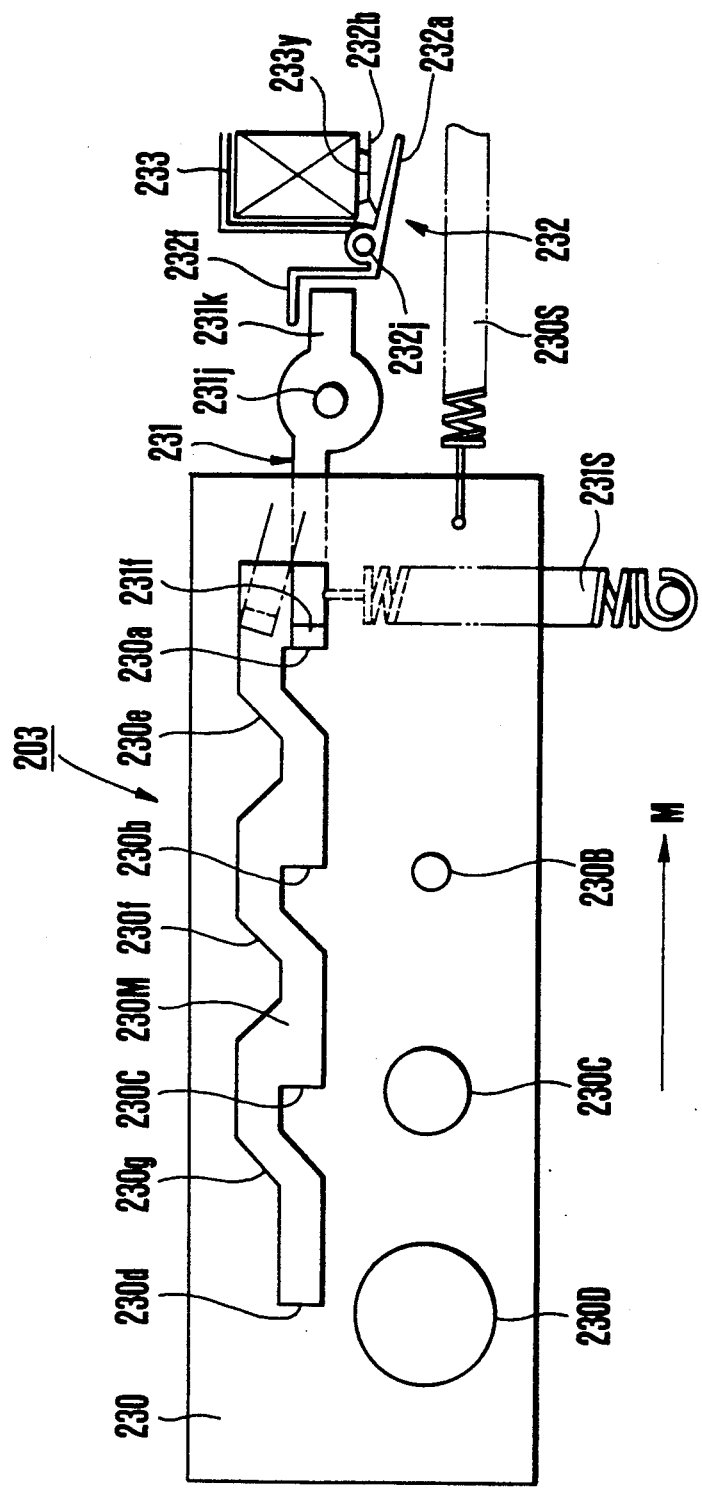
FIG. 14 is a front view of the diaphragm device.

The diaphragm plate 230 is of a rectangular shape having a longitudinally cut-out slot 230M in the upper part thereof. The slot 230M consists of lock parts 230a to 230d and slanting parts 230e to 230g. Meanwhile, in the lower part of the slot 230M, there are provided diaphragm holes 230B to 230D which are located in positions corresponding to the above stated lock parts 230b to 230d respectively. A coiled spring 230S which is attached to the right-hand side of the diaphragm plate 230 is arranged to urge the diaphragm plate 230 to move to the right (or in the direction of arrow M). The diaphragm plate 230 is thus arranged to be movable along some guide device which is not shown. Referring to FIg. 14, the further details of the diaphragm device 203 are as follows: FIG. 14 is a plan view of the diaphragm device 203. A lock pawl 231 has a hook part 231f which is formed at the fore end of the pawl and is arranged to engage the slot 230M. The lock pawl 231 is turnable on a shaft 231j and is under a counterclockwise urging force of a coiled spring 231S. An armature 232 is arranged to be of an L-shape in the longitudinal section thereof. The armature 232 has a hook part 232f which is formed at the upper end and is bent outward. A shaft 232j is arranged to permit the armature to be turnable thereon. A leaf spring 232b which abuts on the yoke 233y of a magnet 233 is welded to the armature 232 and is arranged to urge the armature 232 to turn round clockwise (see FIG. 14).

Figure 15A:
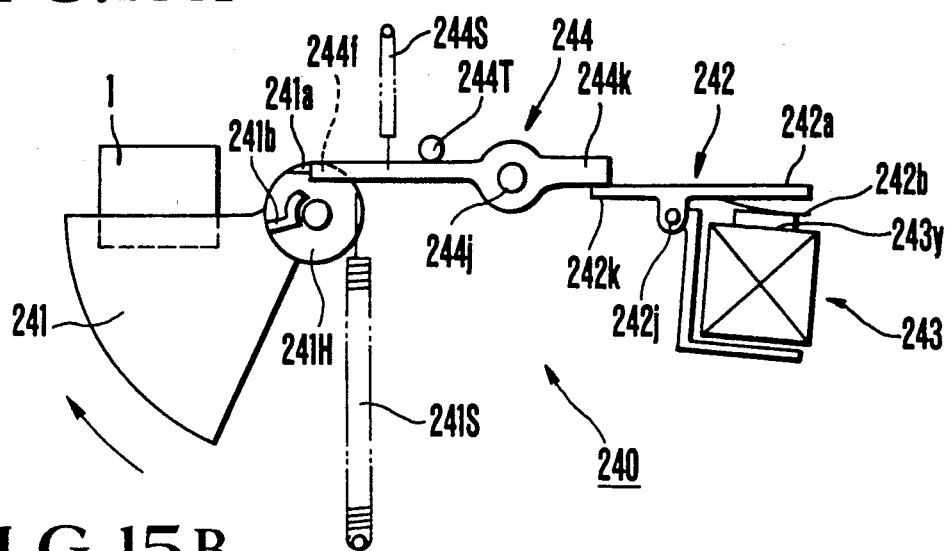
FIGS. 15A to 15C are front views showing the operation of the shutter device, FIG. 15A showing the embodiment as in an initial state, FIG. 15B showing it as in a state of having the whole surface of an image sensor 1 shielded from light by a leading shutter blade 241 and FIG. 15C showing the image sensor as in a state of being exposed to light with the leading blade 241 allowed to travel.
Figure 15B:
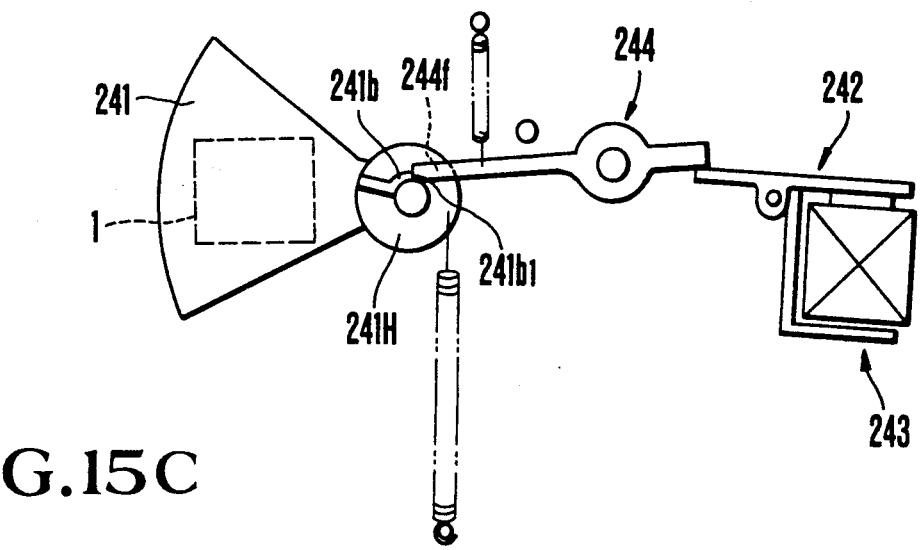
Figure 15C:
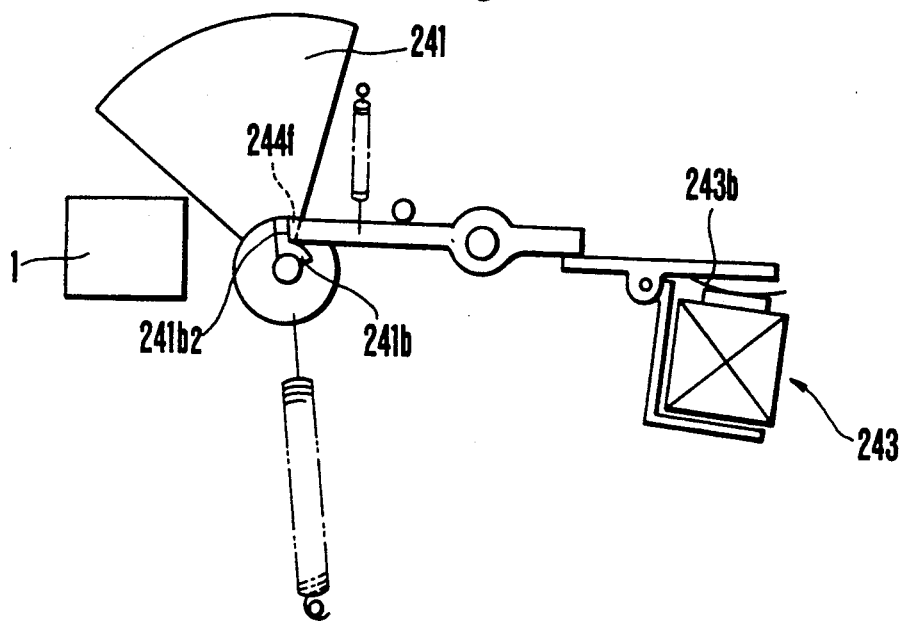

The shutter device 204 is arranged as follows: FIGS. 15A to 15C are front views showing an unclamping and displacement limiting device 240 which is provided for the leading shutter blade 241. The device 240 includes projections 241a and 241b which are arranged at a leading blade carrying part 241H to restrict the position of the leading blade 241. A coiled spring 241S is attached to the carrying part 241H and is arranged to impart a turning force to the leading blade 241 for turning it round clockwise as viewed on the drawing. A lock member 244 is arranged to be urged by a coiled spring 244S to turn round clockwise on a shaft 244j. A hook part 244f is formed at the fore end of the lock member 244 and is arranged to engage the above stated projections 241a or 241b. A stopper 244T is arranged to limit the clockwise turning movement of the lock member 244.

A flat plate shaped armature 242 is arranged to turn round on a shaft 242j. A leaf spring 242b which abuts on the yoke 243y of a magnet 243 is welded to the armature 242 and is arranged to urge the armature 242 to turn round counterclockwise.

Further, an unclamping and displacement limiting device 250 which is provided for the trailing shutter blade 251 is arranged almost in the same manner as the device 240 for the leading shutter blade 241 with the exception that, unlike the leading blade 241, the trailing blade 251 is not provided with a projection corresponding to the projection 241b. The device 250 comprises the trailing shutter blade 251, a coiled spring 251S, a lock member 254, a coiled spring 254S, a stopper 244T, an armature 252, a magnet 253, etc. (see FIG. 13).

The second embodiment of the invention which is arranged as described above operates as follows: When a shutter release button which is not shown is pushed, a light measurement is first performed by means of a light receiving photo-sensitive element which is not shown, etc. By this, an aperture diameter is tentatively selected. In the case of this specific embodiment, the diaphragm plate 230 is provided with the diaphragm holes 230B, 230C and 230D which have different diameters. One of these different diameters of the diaphragm holes 230B to 230D is selected through the above stated preliminary exposure. Referring now to FIG. 14, the diaphragm plate 230 which is arranged in this manner operates as follows:

FIG. 14 shows the hook part 231f of the lock pawl 231 as in a state of engaging the lock part 230a provided in the upper part of the diaphragm plate 230. Under this condition, the image sensor 1 is shielded from light. Assuming that the diaphragm hole 230B is selected by the preliminary exposure for light re-measurement, one electric pulse is applied to the magnet 233. Then, the magnet 233 pulls the armature part 232a of the armature 232 against the resilient force of the coiled spring 232b. This causes the armature 232 to turn round counterclockwise. The hook part 232f then pushes the base end part 231k of the lock pawl 231 to cause the lock pawl 231 to turn round clockwise against the force of the coiled spring 231S. As a result, the hook part 231f of the pawl 231 disengages from the lock part 230a as indicated by a two-dot-chain line. Therefore, the diaphragm plate 230 is allowed to be moved by the force of the coiled spring 230S in the direction of arrow M. The hook part 231f of the pawl 231 then comes to abut on the slanting part 230e formed within the slot 230M. The lock pawl 231 is unable to come back to its original position as long as the armature 232 is pulled by the magnet 233. Therefore, in case that the hook part 231f comes to abut on the slanting part 230e earlier than the return of the armature 232, the stop plate 230 stays in the state of having the hook part 231f abutting on the slanting part 230e. When the pulling force of the magnet 233 disappears after that to permit the return of the armature 232 or when the abutting of the hook part 231f is later than the return of the armature 232, the hook part 231f comes back to its original position sliding over the slanting part 230e. Then, the next lock part 230b comes to abut on the hook part 231f to bring the diaphragm plate 230 to a stop. As a result, the diaphragm hole 230B comes to be located on the optical axis 202. To bring another diaphragm hole 230C onto the optical axis 202, another electric pulse is applied to the magnet 233. For bringing the diaphragm hole 230D onto the optical path, a further electric pulse is applied to the magnet 233.

With the diaphragm plate 230 shifted to select an aperture of the diaphragm device 203 in the above stated manner, a preliminary exposure is performed with the image sensor 1 partly shielded from light by the leading shutter blade 241. The result of the preliminary exposure is used for a real exposure. The reasons for shielding about 30% of the image sensor 1 in the lower part thereof as shown in FIG. 13 in carrying out the preliminary exposure are as follows: The image of an object is formed upside down on the image sensor 1 by the photo taking optical system. Meanwhile a part of a scene which is extremely bright relative to the object is often located in the above stated part of the image sensor 1. Such a bright part is unnecessary for light measurement. Further, in the event of an image sensor which has no accumulating or integrating part, the above stated light shielded part may be utilized as an integrating part. Besides, with electric charge for the middle part of the object accumulated at an end part of the light receiving surface of the image sensor 1, the electric charge of the image sensor 1 can be transferred at a faster speed.

With the light measuring operation performed by using the image sensor 1 in this manner, an aperture value and a shutter speed value are determined before a real exposure.

The diaphragm plate 230 is first shifted to a position to bring one of the diaphragm holes selected by the diaphragm device 203 onto the optical axis 202. At the same time, the leading blade 241 of the shutter device 204 turns round clockwise until it covers the whole surface of the image sensor 1. When an aperture value is determined, the leading blade 241 further turns round in the same direction to initiate an exposure action on the image sensor 1. The trailing blade 251 also turns round following the leading blade 241 according to the predetermined shutter speed. Upon completion of the turning movement, the whole surface of the image sensor 1 is covered. Further details of these actions are as described below with reference to FIGS. 15A to 15C:

Referring to FIG. 15A, in the state of having about 30% in its lower part covered by the leading blade 241, the image sensor 1 is exposed to light incident thereon via one of the diaphragm holes with the diaphragm plate 230 shifted to a predetermined position (the preliminary exposure). Light measurement is performed by using the output of the image sensor 1 thus obtained. A final aperture value is thus determined. After the lapse of a preset shutter time with the diaphragm plate 230 having been shifted to the predetermined position, the magnet 243 is energized. The armature part 242a of the armature 242 is pulled by the yoke 243y. The armature 242 turns round clockwise on the shaft 242j. The driving part 242k of the armature 242 then pushes upward the base end part 244k of the lock member 244 against the force of the coiled spring 244S. This causes the lock member 244 to turn round counterclockwise on the shaft 244j. The hook part 244f is disengaged from the projection 241a. This allows the leading blade 241 to be turned round clockwise by the force of the coiled spring 241S. The leading blade 241 comes to a stop when the hook part 244f of the lock member 244 comes to abut on the inner side face 241b1 of another projection 241b provided on the leading blade carrying part 241H, as shown in FIG. 15B. The image sensor 1 is reset in this state (with signal electric charge completely read out from the sensor 1) and the preparation for a real exposure is completed. After completion of the resetting action, when the power supply to the magnet 243 is cut off, the armature 242 and the lock member 244 return to their initial states. Therefore, the hook part 244f disengages from the inner side face 241b1 of the projection 241b. Then, the leading blade 241 is turned round further clockwise by the force of the coiled spring 241S and comes to a stop with the hook part 244f coming to abut on the outer side face 241b2 of the projection 241b, as shown in FIG. 15C, in a position where it does not shield the image sensor 1 from light. The leading blade 241 is thus arranged to take two step positions according to the on and off actions of the magnet 243.

In other words, in the initial state thereof, the shutter device 204 shields from light about 30% of the image sensor 1 in the lower part thereof for the preliminary exposure for light measurement. The aperture and shutter speed values are determined through the light measurement. Then, with the magnet 243 energized, the leading blade 241 turns round to light-shield the whole surface of the image sensor 1 before the image sensor 1 is reset. The real exposure begins when the power supply to the magnet 243 is cut off. Following that, the magnet 253 which is shown in FIG. 13 is energized to disengage the lock member 254 from the trailing blade 251. The trailing blade 251 is then allowed to be turned round clockwise by the force of the coiled spring 251S and thus serves to shield the image sensor 1 from light after the real exposure.

Upon completion of the real exposure, a charging mechanism which is not shown comes to move the diaphragm plate 230 in the direction reverse to the direction of arrow M against the force of the coiled spring 230S and to move the leading and trailing blades 241 and 251 counterclockwise against the forces of the coiled springs 241S and 251S. The charging action of the charging mechanism is completed with the diaphragm plate 230 and the leading and trailing blades 241 and 251 thus moved back to their initial positions.

The positional relation of the leading and trailing blades 241 and 251 in the direction of the optical axis 202 is as follows: A boundary between the part of the image sensor 1 which is shielded from light by the shutter blade and the other part of the sensor 1 which is not shielded from the light becomes clearer accordingly as the light shielding blade is located closer to the image forming part, i.e. the image sensor 1. The image sensor 1, therefore, can be more effectively shielded from light with the light shielding blade disposed closer to the image sensor 1. Further, with the leading blade 241 employed as the partial light shielding blade for the preliminary exposure, a sequence of actions for the exposure can be performed by shifting all the pertinent parts in one and the same direction.

Figure 16A:
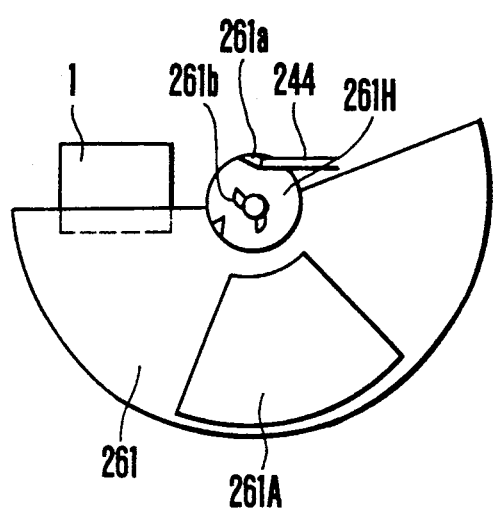

A third embodiment of this invention is capable of accomplishing the same functions as the above described functions with a more simplified arrangement. The third embodiment is arranged as described below with reference to FIGS. 16A to 16D:

While the second embodiment described in the foregoing is arranged to use two travelling shutter blades including the leading and trailing blades 241 and 251, the third embodiment is arranged to use only one travelling blade. As shown in FIG. 16A, a blade 261 is in a shape formed as if three pieces of the above stated leading blade 241 are continuously arrayed side by side. Of the three portions of the blade 261, each corresponding to the leading blade 241, the middle portion is arranged in the form of an opening 261A which is provided for a real exposure. A blade carrying part 261H is provided with projections 261a to 261d. With the exception of these points, the shutter device of the third embodiment is arranged in about the same manner as the shutter device 204 of the second embodiment. Meanwhile, the diaphragm device of the third embodiment is arranged in the same manner as that of the second embodiment and is, therefore, omitted from the following description: Referring to FIG. 16A, About 30% of the image sensor 1 in the lower part thereof is covered or shielded by the blade 261 with a lock member 244 in a locking engagement with the projection 261a of the blade 261.

Figure 16B:
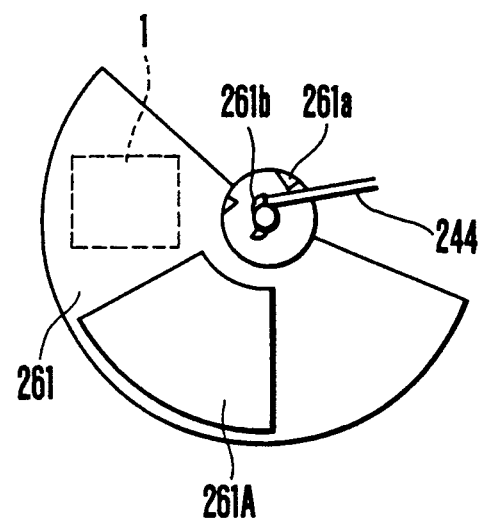
Figure 16C:
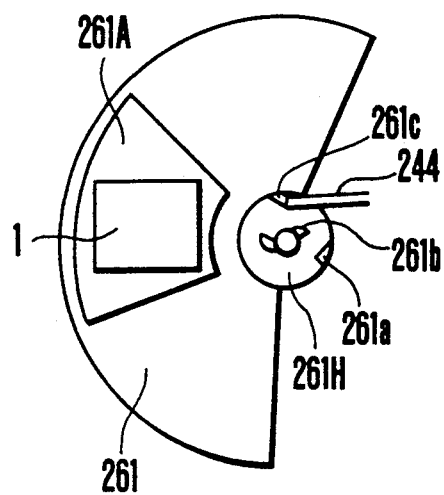
Figure 16D:
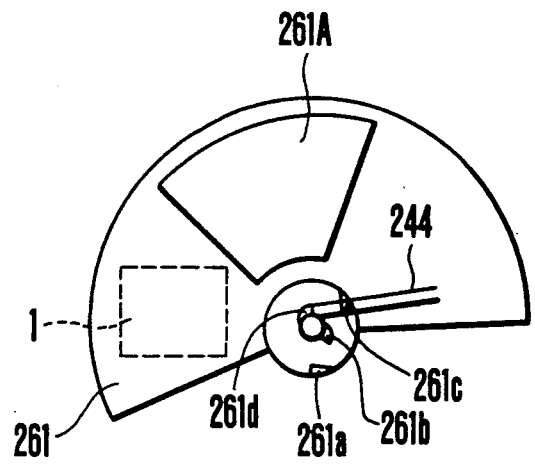

When a magnet which is not shown is energized after completion of a preliminary exposure, the lock member 244 is disengaged from the projection 261a. The blade 261 is then allowed to be turned round by the tensile force of a coiled spring which is not shown in the clockwise direction as viewed on the drawing. The rotation of the blade comes to a stop when it is locked at the projection 261b. Then, as shown in FIG. 16B, the image sensor 1 is completely covered by the blade 261. Following that, when the power supply to the magnet is cut off, the lock member 244 is disengaged from the projection 261b and comes to engage another projection 261c, as shown in FIG. 16C. Under this condition, the image sensor 1 is exposed to light through the exposure opening 261A. Then, when the above stated magnet is again energized after the lapse of time corresponding to a shutter speed, the lock member 244 is disengaged from the projection 261d to allow the blade 261 to further rotate to complete the exposure. The rotation of the blade 261 comes to a stop when the lock member 244 engages the projection 261d as shown in FIG. 16D.

Figure 17A:
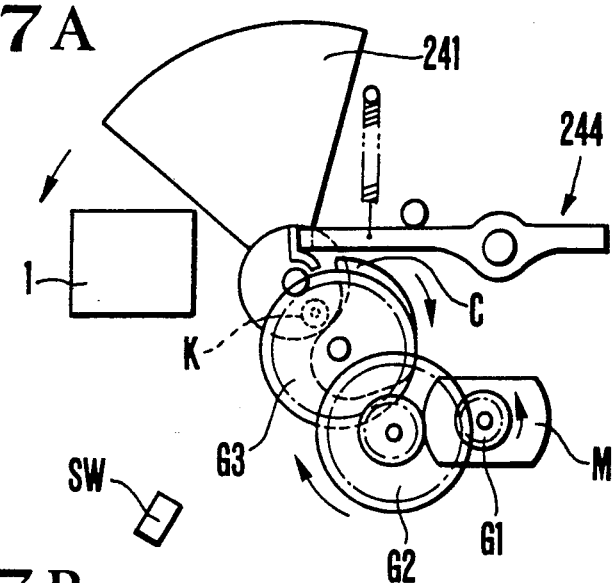
FIGS. 17A, 17B and 17C show a charging mechanism provided for charging the shutter device of FIG. 13.
Figure 17B:
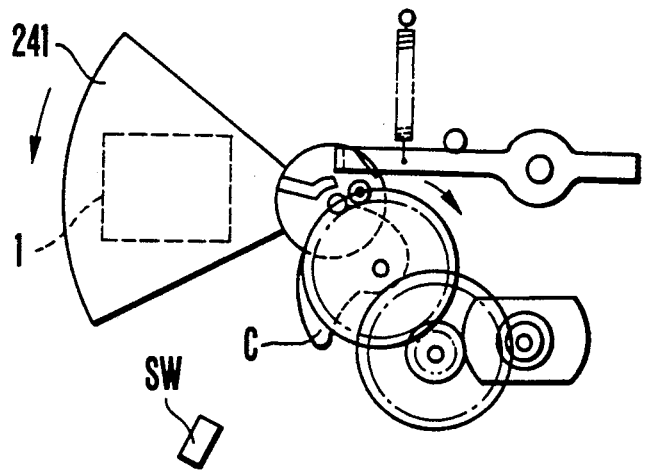
Figure 17C:
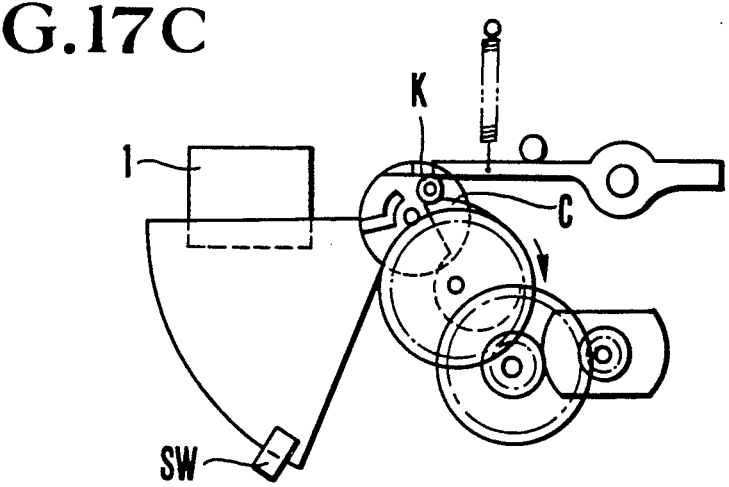

In the second embodiment described above, a charging mechanism for charging the exposure control members after completion of the exposure is arranged as follows: FIGS. 17A, 17B and 17C show the essential parts of the charging mechanism for the leading shutter blade 241 which is shown in plan views in FIGS. 15A, 15B and 15C. FIG. 17A corresponds to an exposing state shown in FIG. 15C, FIG. 17B to a light shielding state shown in FIG. 15B and FIG. 17C to a charge completed state shown in FIG. 15A.

Referring to FIGS. 17A, 17B and 17C, these illustrations include a charging motor M; gears G1 to G3 which are arranged to transmit the driving force of the motor M; and a cam C which is connected to the gear G3. A roller K is arranged on the leading blade 241 to be lifted up by the cam C which is formed in one body with the gear G3. The gear G3 is connected to the motor M via other gears G2 and G1. A photo-interrupter SW is arranged to detect the presence or absence of the blade and to control the rotation of the motor accordingly. In the state as shown in FIG. 17A, when the motor M begins to rotate counterclockwise, the gear G3 and the cam C rotate clockwise. The roller K is lifted upward as viewed on the drawing by the cam C. This causes the leading blade 241 to begin to turn round counterclockwise. The state of FIG. 17A then shifts to the state of FIG. 17C through the state of FIG. 17B. In the state as shown in FIG. 17C, the roller K is charged by the cam C almost up to its initial position. The photointerrupter SW then detects the blade and cuts off a current supply to the motor M. The gears G1, G2 and G3 then rotate further from the state of FIG. 17C by the force of inertia. The charging action is then completed as the cam C completes one turn thereof with the roller k plunging into the lowest part of the cam C. In this instance, the leading shutter blade 241 is locked by the lock member 244. In the meantime, since the rotation angle of the trailing blade 251 required for the exposure is less than that of the leading blade 241, the trailing blade 251 can be arranged to be charged by exactly the same arrangement as the leading blade 241, for example, with the leading blade 241 arranged to hook the trailing blade 251 during the charging process.

The diaphragm device 203 can be likewise charged by arranging a cam to be caused to make one turn by the driving force of a motor in a manner similar to the arrangement shown in FIGS. 17A, 17B and 17C. In this case, the charging action is accomplished by converting the rotative motion into a linear motion and by moving the diaphragm plate 230 in the direction reverse to the direction of arrow M shown in FIGS. 13 and 14.

In a conceivable embodiment of this invention, other than the first, second and third embodiments described, the part of the image forming part (or the image sensor) is arranged to be shielded from light for the preliminary exposure by an additional blade which is provided solely for that purpose in addition to the leading and trailing shutter blades.

In the event of a camera of the silver halide type, the use of the image sensor for light measurement may be replaced with a light receiving photo-sensitive element which is arranged to receive a light flux reflected by the shutter surface or by the film surface.

As apparent from the foregoing, the embodiment described is capable of performing exposure control with a high degree of accuracy by virtue of the arrangement to perform, after a preliminary light measuring action, a real light measuring action or a preliminary exposure in accordance with a signal from the image forming part which is obtained by blocking a part of the effective light flux with a part of the shutter; and, after that, to perform a real exposure.

Figure 18:
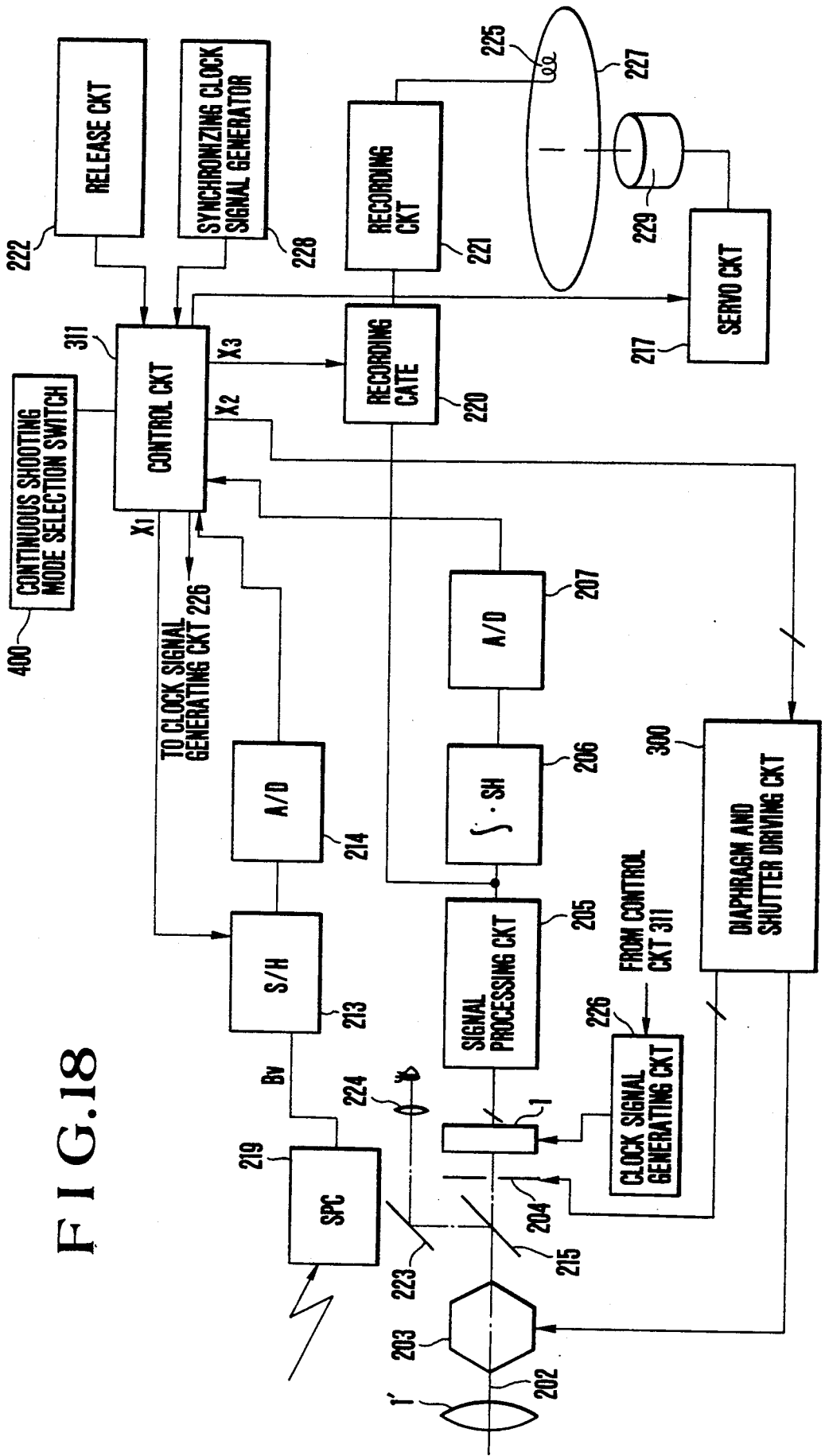
FIG. 18 is a block diagram showing the electric circuit of the image sensing device of the same embodiment.

The following describes with reference to FIG. 18 the electric circuit of the image sensing device which is arranged as described in the foregoing: FIG. 18 is a block diagram showing the electric circuit.

Referring to FIG. 18, a CCD is employed as the image sensor 1. A reference numeral 1' denotes a photo taking optical system. A numeral 203 denotes a diaphragm device. A numeral 204 denotes a shutter device. They are arranged as shown in FIG. 13. A signal processing circuit 205 is arranged to perform various correcting actions on the luminance and chrominance components of a signal produced from the CCD 1. An integration circuit 206 is arranged to integrate a luminance signal which is suitably formed at the signal processing circuit 205 and to sample-and-hold it for every field. An analog-to-digital (A/D) converter 207 is arranged to convert the output of the integration circuit 206 into a digital value. The digital value is supplied to a control circuit 311. A sample-and-hold (S/H) circuit 213 is arranged to sample-and-hold the output of an SPC 219 which is employed as a light measuring element. An A/D converter 214 is arranged to A/D convert a value held by the sample-and-hold circuit 213. A half-mirror 215 is disposed within the photo taking optical system. A servo circuit 217 is arranged to control the rotating state of a motor 229 which is arranged to rotate a magnetic sheet 227.

The above stated SPC 219 is arranged separately from the image sensor 1. A recording gate 220 is arranged to determine whether an image signal from the signal processing circuit 205 is to be supplied to a recording circuit 221 or not. The recording circuit 221 is arranged to modulate the image signal produced from the signal processing circuit 205 into a form recordable on the magnetic sheet 227 through a head 225. A numeral 222 denotes a release circuit. A half-mirror 223 is arranged to guide a portion of light reflected by the half-mirror 215 to a view finder optical system 224. A numeral 225 denotes the above stated head. A numeral 227 denotes the above stated magnetic sheet. A clock signal generating circuit 226 is arranged to generate a clock signal for driving the image sensor 1. The timing of the clock signal generated by the circuit 226 is controlled by the control circuit 311.

A synchronizing clock signal generator 228 is arranged to generate reference clock pulses for synchronizing the whole system. A diaphragm and shutter driving circuit 300 is arranged to drive the magnets 233, 243 and 253 which are mentioned in the foregoing according to the instructions of the control circuit 311.

The control circuit 311 controls the diaphragm device 203, the shutter device 204 and other circuit blocks. The control circuit 311 is arranged to receive the output of the release circuit 222 and that of the synchronizing clock signal generator 228 for forming a synchronizing signal; and to produce control outputs X1, X2 and X3 as shown in a flow chart in FIG. 21.

Figure 19:
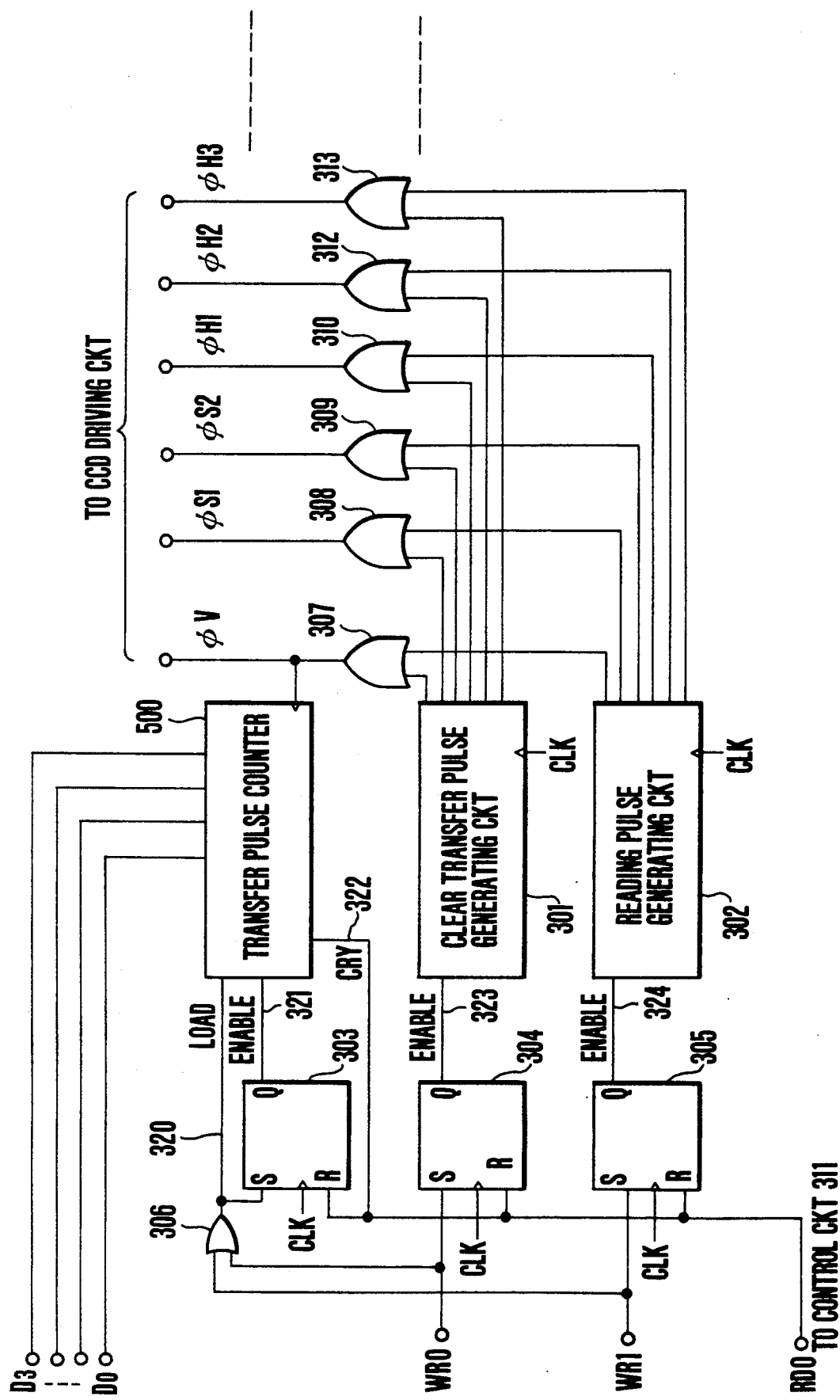
FIG. 19 is a block diagram showing the internal details of a clock signal generating circuit shown in FIG. 18.

A continuous shooting mode selection switch 400 is arranged to have a first switch position in which a so-called single shooting mode is selected to permit a shot when the release circuit 222 turns on; a second switch position, in which a continuous shooting mode is selected to permit continuous shooting during the on-state of the release circuit 222; and a third switch position, in which a fast continuous shooting mode is selected to permit faster continuous shooting than in the second switch position. The internal arrangement of the clock signal generating circuit 226 is as follows:

FIG. 19 shows in a block diagram the details of the clock signal generating circuit 226. Referring to FIG. 19, a counter 500 counts the number of pulses produced from an OR gate 307. The counter 500 is an up-counter and is arranged to load the value of data buses D0 to D3 produced from the control circuit 311 with a load pulse 320 produced from an OR gate 306 and, by using the value thus obtained as an initial value, to count when an enable signal 321 produced from an RS flip-flop (RS-FF) 303 is at a high level. A carry signal 322 is arranged to be generated when the counter 500 reaches a full count state. This counter has a sufficient counting capacity for all the picture elements of the CCD 1 (image sensor) aligned in the vertical direction. In the case of this embodiment, the image sensor 1 has 250 picture elements in the vertical direction. In other words, the carry signal is generated when the count value of the counter 500 reaches "250." A clear transfer pulse generating circuit 301 is arranged to generate a timing signal for clearing the CCD 1 by transferring, in the vertical direction, the electric charge accumulated at the CCD 1. The transfer pulse signal is generated when an enable signal 323 produced from an RS-FF 304 is at a high level. The data buses D0 to D3 is provided between the control circuit 311 and the clock signal generating circuit 226. Although a total of four data buses are shown in the case of this embodiment, the number of data lines WR0 and WR1 are provided between the control circuit 311 and the clock signal generating circuit 226. A discrimination line RD0 is provided for the purpose of discriminating the state of the clock signal generating circuit 226. A reading pulse generating circuit 302 is arranged to generate a timing signal for reading the electric charge accumulated at the CCD 1. The circuit 302 generates the transfer pulse signal when an enable signal 324 produced from an RS-FF 305 is at a high level.

Figure 20:
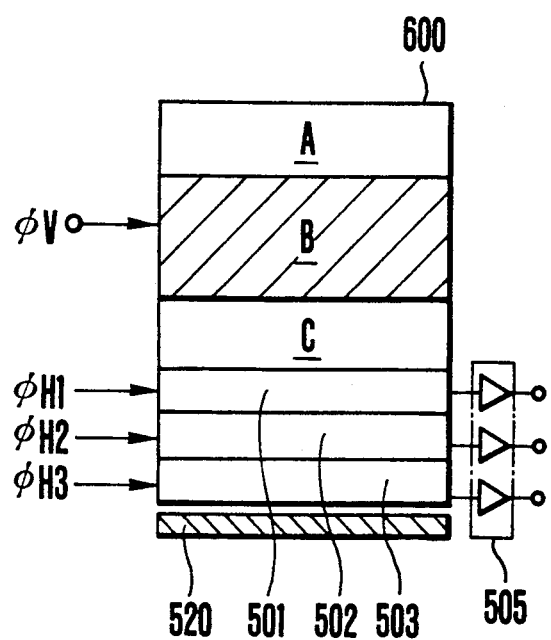
FIG. 20 is a plan view showing a CCD which is employed as the image sensor 1.

Further, an example of the structural arrangement of the CCD 1 to be employed for this embodiment is described as follows with reference to FIG. 20: Referring to FIG. 20, an image sensing part 600 is provided with stripe filters of three primary colors including red (R), green (G) and blue (B). In this case, 250 picture elements are aligned in the vertical direction. Reference symbols A, B and C denote parts which are of the same structural arrangement but are shown solely for the convenience of description. The part C is to be shielded from light by the leading shutter blade 241 when the shutter is in the position shown in FIG. 15A. The image sensing part 600 performs photoelectric conversion and accumulates electric charge at each of the picture elements according to the quantity of light incident thereon. Horizontal transfer registers 501, 502 and 503 are provided for reading out a video (or image) signal transferred from the image sensing part 600. Further, in the case of this specific embodiment, the CCD 1 is arranged to receive a light flux when the diaphragm device 203 and the shutter device 204 are opened and, after the shutter device 204 is closed, to have electric charge serially transferred to the horizontal transfer registers 501 to 503 for every horizontal line. More specifically, the electric charge transfer is allotted according to pulses φS1 and φS2 (shown in FIG. 19) in such a manner that the electric charge accumulated at the picture elements covered by the R stripe filter is transferred to the register 501, the electric charge accumulated at the picture elements covered by the G stripe filter to the register 502 and the electric charge accumulated at the picture elements covered by the B stripe filter to the register 503. An output amplifier part 505 is arranged to amplify the signals read out from the horizontal transfer registers 501 to 503. A drain 520 is arranged to receive the overflow of remnant electric charge which remains at the horizontal transfer registers 501 to 503 when the transfer pulses are generated by the transfer pulse generating circuit 301.

Further, the image sensing part 600 is arranged to receive a transfer pulse φV of FIG. 19 and the horizontal transfer registers 501, 502 and 503 to receive transfer pulses φH1 to φH3, φS1 and 100 S2 of FIG. 19 respectively. Further, the circuit for generating these pulses can be formed by a suitable combination of counter circuits, though details of such a circuit are omitted herein.

Again referring to FIG. 19, an RS-FF 303 is arranged to be set by the high level output of an OR gate 306 and to be reset by the rise of the carry signal 322 of the counter 500. RS-FFs 304 and 305 are respectively arranged to be set by the high level outputs WR0 and WR1 of the control circuit 311 and to be reset by the rise of the carry signal 322. OR gates 307 to 310 and 312 are arranged to obtain and produce the logical sums of the output of the clear transfer pulse generating circuit 301 and that of the reading pulse generating circuit 302 which differ in timing. These OR gates are connected to the CCD 1 as mentioned in the foregoing.

Figure 21:
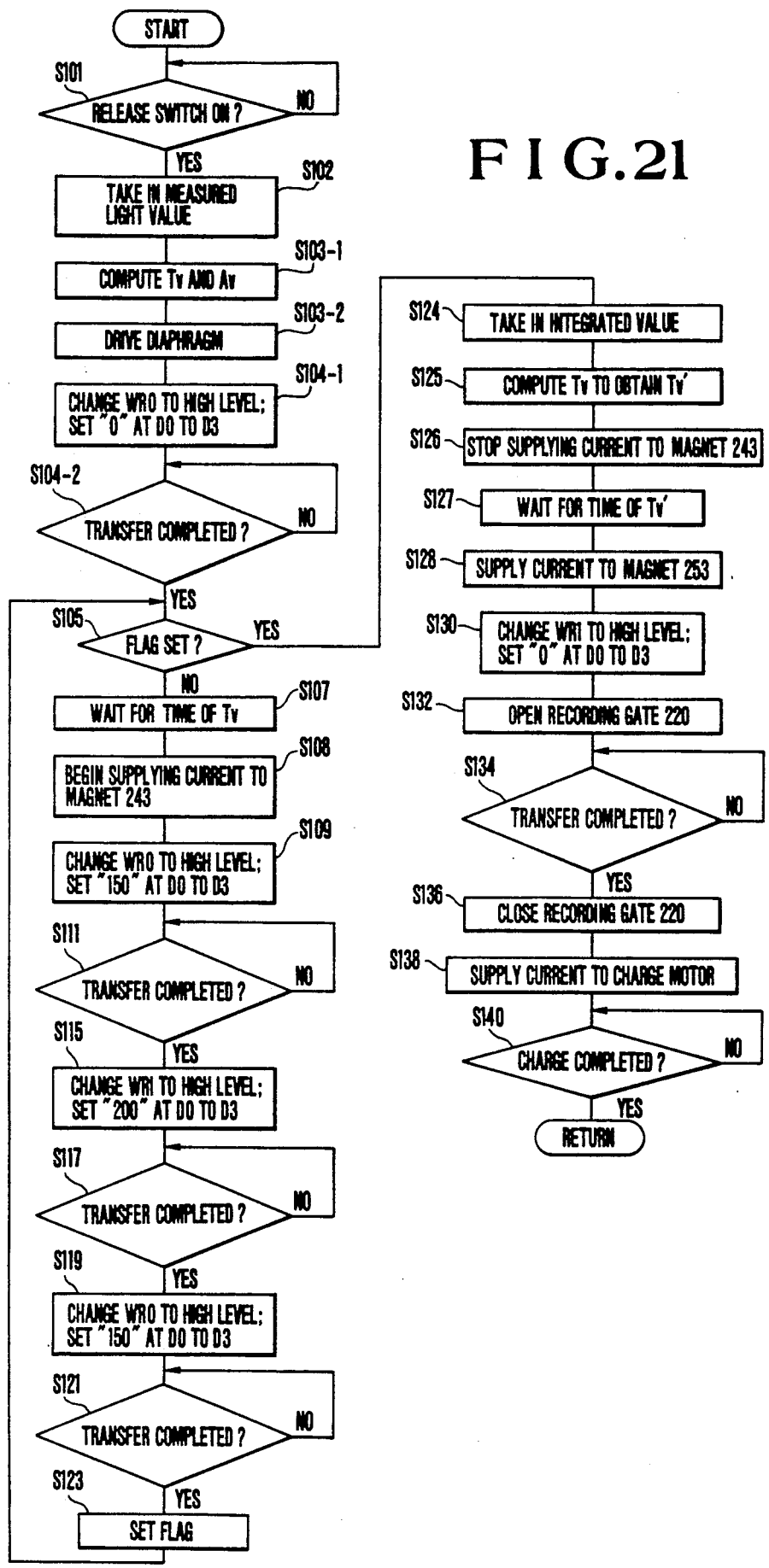
FIGS. 21 and 22 are flow charts respectively showing the operation of a control circuit 311 which is included in FIG. 18.
Figure 22:
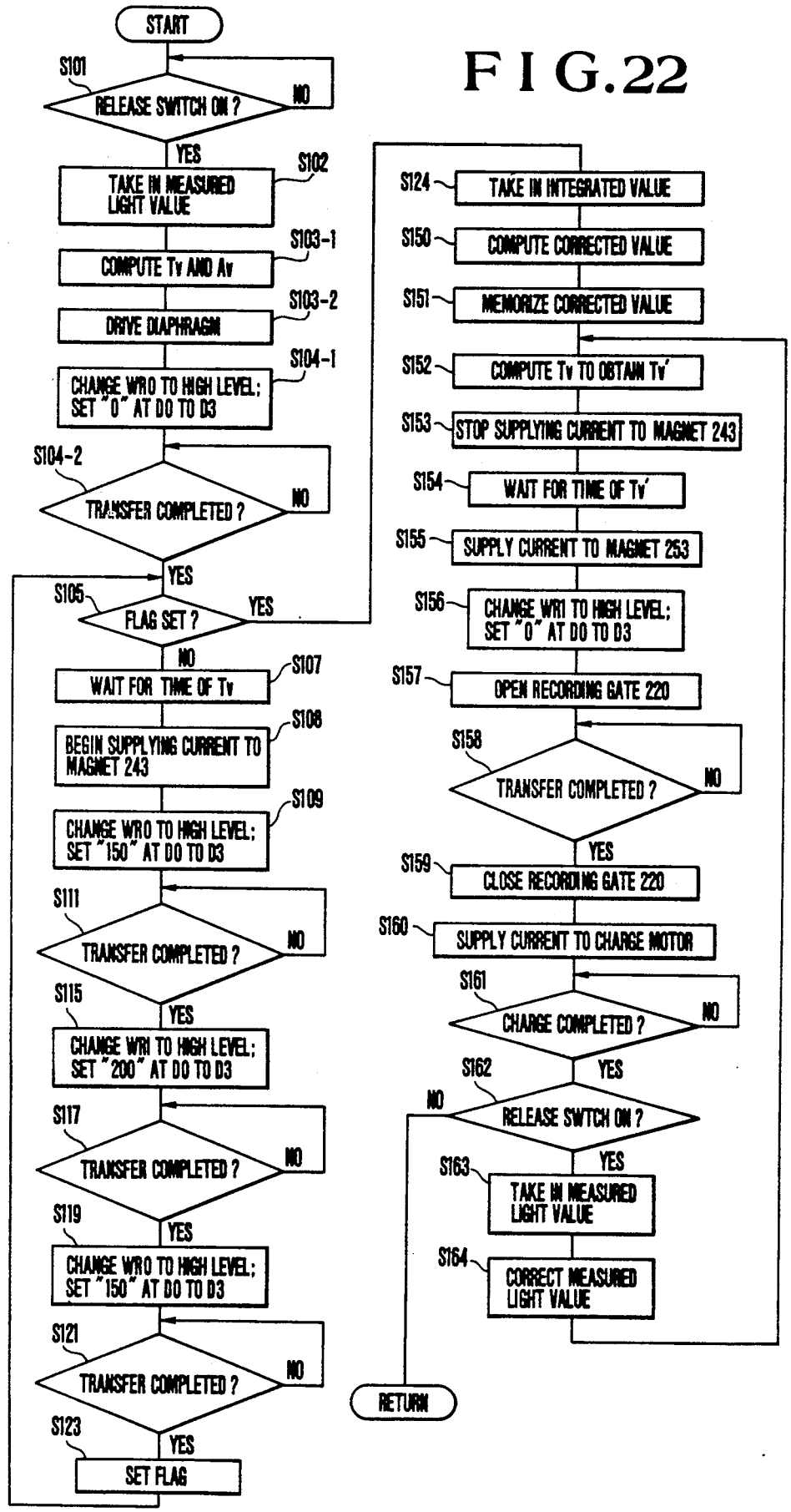

Referring to FIGS. 21 and 22, the embodiment which is arranged in the above stated manner operates as follows: FIG. 21 is a flow chart showing the operation of the control circuit 311 of FIG. 18 to be performed in a single shooting mode and in a low-speed continuous shooting mode. Referring to FIG. 21, at a step S101: A check is made for a signal from a release circuit 222 indicating the on-state of the release switch. At a step S102: If the above stated signal is found to have been obtained, the sample-and-hold circuit 213 is driven to take in, as a measured light value, the output of the SPC 219 which is employed as the light measuring element. A step S103-1: Values TV and AV are computed according to the measured light value obtained. Since the diaphragm device 203 of this embodiment is arranged to have three diaphragm holes 230B, 230C and 230D, one of the three aperture values of these holes is selected as the value AV. Then, the value TV is obtained by computing the selected AV value and the measured light value. As a result the value TV becomes a continuous value. Step S103-2: Next, a current supply is effected to the magnet 233 according to the obtained TV value to have the diaphragm plate 230 moved in the direction of arrow M as shown in FIG. 13. As a result of this, the upper parts A and B of the CCD 1 are exposed to light while the lower part C is shielded from light by the leading shutter blade 241 as shown in FIG. 15A. Step S104-1: While the diaphragm plate 230 begins to be driven, the control circuit 311 makes the level of the control line WR0 thereof high and sets the data lines D0 to D3 at "0". Therefore, the transfer pulse counter 500 is loaded with "0" and the RS-FF 304 is set. As a result, the clear transfer pulse generating circuit 301 produces the above stated pulses including the φV, etc. to clear the CCD 1. The transfer pulse counter 500 counts the pulses φV. When the number of the pulse φV reaches "250", i.e. when the signals accumulated at the image sensing part 600 are completely transferred, the counter 500 produces the carry signal 322. Step S104-2: The control circuit 311 then makes a check for the carry signal 322 to find whether or not the transfer has been completed. Step S105: A check is made to see if a flag which will be described later is set. If not, the flow comes to a step S107. Step S107: The flow of operation waits for the lapse of the shutter time computed at the above stated step S103-1.

The diaphragm driving action performed at the step S103-2 causes a given length of time lag before actually the diaphragm hole is open due to some response delay of the mechanical force transmission parts such as the armature 232 and the lock pawl 231 after the magnet 233 is energized. Whereas, the clearing action on the electric charge accumulated or integrated at each picture element of the CCD 1 is accomplished in a very short period of time at the steps S104-1 and S104-2. Therefore, by the time when the CCD 1 is exposed to light with the diaphragm actually opened, the electric charge has been cleared from every picture element of the CCD 1.

Step S108: After waiting for the length of time of the computed TV value at the step S107, the magnet 243 which is shown in FIGS. 13 to 15 is energized. As a result, the shutter device 204 shifts from the state of FIG. 15A to the state of FIG. 15B. Step S109: After the energization of the magnet 243, the control circuit 311 makes the level of its terminal WR0 high to set the data buses D0 to D3 at "150". Accordingly, a high level signal is supplied to the input terminal S of the RS-FF 304. Meanwhile, the data "150" set on the data buses D0 to D3 is loaded on the transfer pulse counter 500.

When the RS-FF 304 is set by a next clock signal, the clear transfer pulse generating circuit 301 begins to operate to generate the above stated pulses φV, etc. During this period, vertical transfer is effected at a higher speed than a normal speed. Then, when the number of the pulses φV reaches the given number, the count value of the transfer pulse counter 500 becomes "250" and the carry signal is produced from the counter 500. In response to the carry signal, the RS-FFs 304 and 305 are reset and the generation of the transfer pulses comes to a pause. Step S111: The control circuit 311 finds the end of the transfer from the carry signal. The flow of operation then comes to a step S115. At this point of time, the electric charge of the part B of FIG. 20 is transferred to the lower part C.

Further, in the shutter driving action performed at the step S108, there also arises some response delay of the mechanical force transmission parts, like in the case of the diaphragm driving action. Therefore, there is some time delay before the shutter comes to the position of FIG. 15B from the position of FIG. 15A. However, with the steps S109 and S111 executed, the electric charge of the image sensing part 600 is transferred at a very high speed. Therefore, during the period of this time delay, the electric charge of the part B shown in FIG. 20 is transferred to the part C shielded from light by the shutter at the very beginning, so that the signal thus obtained can be effectively prevented from being deteriorated by the influence of the external light.

The length of time required for generating the electric charge integrated by the integration circuit 206, that is, the length of time after the image sensing part 600 of the CCD 1 is cleared at the steps S104-1 and S104-2 and before the electric charge of the part B of the image sensing part 600 of the CCD 1 is transferred to the part C which is shielded from light by the leading shutter blade at the steps S109 and S111 is not dependent on the response delay time of the mechanical force transmission system of the shutter device but depends solely on the timing of the control signal applied from the control circuit 311 to the clock signal generating circuit 226. Therefore, the embodiment is capable of very accurately controlling the preliminary exposure time.

Step S115: Next, the control circuit 311 sets "200H" on the data buses D0 to D3 by making the level of the control line WR1 high. Accordingly, a high level signal is supplied to the input terminal S of the RS-FF 305 and the transfer pulse counter 500 is loaded with the data "200H" set by the data buses D0 to D3. When the RS-FF 305 comes to be set by the clock signal next time, the reading pulse generating circuit 302 begins to operate and generates the pulses φV, etc. mentioned in the foregoing. Since these pulses are ordinary reading pulses, the signal of the image sensing part 600 is read out through the horizontal shift registers 501, 502 and 503. The signal thus read out is integrated by the integration circuit 206 which is shown in FIG. 18. The output of the integration circuit 206 is taken in at a step S124 which will be described later.

In this instance, a 100 line portion of the video signal is discarded to the drain 520 at the steps S109 and S111 while a 50 line portion of the video signal for the middle part of the picture is integrated. Therefore, any signal that is for an image to be formed in the lower part of the CCD 1 representing a high luminance portion of the picture such as a sky is not integrated.

When the number of the pulses φV produced reaches 50 pulses, the count value of the transfer pulse counter 500 becomes "250". The counter 500 then produces a carry signal. At a step S117: This carry signal is detected to find that the above stated reading action has come to an end. Then, the flow of operation proceeds to a step S119 from the step S117. Steps S119 and S121 are similar to the above stated steps S109 and S111 and thus require no description.

Upon completion of the transfer from the image sensing part 600, a flag is set at a step S123. The flow of operation comes back to the step S105 and then branches out from the step S105 to a step S124.

Step S124: The integrated value of the integration circuit 206 shown in FIG. 18 is taken in from the A/D converter 207. Step S125: A real shutter value TV' is obtained from the integrated value by recomputing the TV value in such a way as to make it possible to obtain a predetermined integrated value. Step S126: The power supply to the magnet 243 is cut off and the shutter is shifted from its position shown in FIG. 15B to the position of FIG. 15C. Step S127: The flow of operation waits for the lapse of the shutter time TV'. Step S128: After the waiting time, the magnet 253 is energized to shield from light the front surface of the CCD 1 by allowing the tailing shutter blade to travel. Step S130: The level of the terminal WR1 is made to be high and "0" is set on the data buses D0 to D3. Then, in the same manner as at the step S115, the reading pulse generating circuit 302 begins to operate. Normal reading from the image sensing part 600 begins. Step S132: Then, at the same time, the recording gate 220 is opened to allow one picture plane portion of the video signal to be recorded by the recording circuit 221.

Step S134: A check is made for the end of the signal transfer, i.e. completion of recording of one picture frame portion of the video signal. If the end of transfer is thus found, the flow of operation proceeds to a step S136. Step S136: The recording gate 220 is closed. Step S138: A current is supplied to the charging motor M. The position of the switch SW shown in FIGS. 17A to 17C changes. Step S140: When the charging action on the shutter and diaphragm devices is completed, the flow of operation comes back to the step S101.

As mentioned in the foregoing, the embodiment is arranged to measure light by means of the SPC 219 to pre-adjust the aperture; after that, to open the shutter for a given period of shutter time; to read out the signal of the image sensor accumulated during the given period of time; to perform exposure control according to the signal thus read out; and the portion of the signal of the image sensor which is not used for exposure control is discarded by reading it out at a high speed. The output of the image sensor, therefore, is very accurately controlled to be constant. It is another advantage of the embodiment that the tame lag which takes place before image recording is actually accomplished after a release signal is produced from the release circuit 222 can be held to a minimal degree.

In accordance with the arrangement of the clock signal generating circuit 226 shown in FIG. 19, the number of pulses produced from the clear transfer pulse generating circuit 301 and that of the pulses produced from the reading pulse generating circuit 302 are both arranged to be counted by one and the same counter 500. This greatly simplifies the arrangement of the embodiment.

Further, the counter 500 is arranged to be a presettable counter and the clock signal generating circuit 226 to be presettable from outside thereof. This arrangement not only enables the signal of any part other than the middle part of the picture plane of the image sensor to be very quickly read out but also enables the size of the reading part to be adjustable from outside as desired. The arrangement thus enables the clock signal generating circuit to be usable also for some other purpose such as evaluative light metering in performing exposure control. In other words, this invention is applicable also to other purposes such as evaluative light metering, etc.

While an up-counter is used for counting the transfer pulses in this specific embodiment, the counter of course may be replaced with a down-counter. In that case, a desired value of pulse number is preworded.

Referring to FIG. 22, the sequence of actions to be carried out in the high speed continuous shooting mode are as follows: The sequence of actions from a step S101 to S123 are the same as in the case of the single shooting mode and, therefore, require no further description.

In the continuous shooting mode, when the flag is set at the step S105 and the integrated value is taken in, the flow comes to a step S150. At the step S150: a correction value is obtained by computation from a difference between the measured light value obtained at the step S102 and the integrated value obtained at a step S124. Step S151: The correction value thus obtained is stored. Steps S152 to S160: A shooting action is performed by performing an exposure according to the corrected value TV' in the same manner as at the steps S125 to S138 of the single shooting mode.

At a next step S161: A check is made to see if the charging action has been completed. If so, the flow comes to a step S162. Step S162: A check is made to see if the release switch is in its on-state. If not, the flow of operation comes back to the step S101. If the switch is found to be on, the flow proceeds to a step S163. Step S163: The measured light value is taken in in the same manner as at the step S102. Step S164: The measured light value is corrected by subtracting the corrected value stored at the step S151 from the measured light value.

The flow of operation then comes back to the step S152 to make a second shot by the same sequence of actions as in the case of the first shot. In the continuous shooting mode, if the release switch SW is found to be on, the sequence of actions from the step S152 to the step S164 are repeated. However, in the event of any change that takes place when the recording has been finished up to the last track on the magnetic sheet or when the continuous shooting mode is cancelled halfway of the recording process, the flow of operation pulls out from this routine. However, since such a process is not directly related to this invention, the details of it are omitted from description.

As mentioned in the foregoing, for the continuous shooting operation, the embodiment of this invention is arranged to correct the degree of exposure by using both the measured light value and the integrated value for the first shot. Then, for each of the second and subsequent shots, the degree of exposure is controlled on the basis of the measured light value and the corrected value stored at the time of the first shot.

Therefore, the length of time required in determining the degree of exposure for each of the second and subsequent shots can be shortened to permit a high speed continuous shooting operation.

Further, since the degree of exposure for the second shot or a subsequent shot is controlled by using the corrected value obtained for the first shot, the exposure control can be accurately accomplished even in the case of continuous shooting.

What is claimed is:

1. An image sensing device comprising an image sensor, a light receiving photo-sensitive element other than said image sensor, and control means receiving the output signals of said image sensor and said light receiving photo-sensitive element, and responsive to indication of relatively high speed continuous or still photography for controlling an accumulating state of photoelectric information of said image sensor with an exposure control signal formed by using both the light receiving element output signal and the image sensor output signal during still photography and for controlling the accumulating state of photoelectric information of said image sensor with said control signal during high speed continuous photography.

2. An image sensing device according to claim 1, wherein during second and subsequent shots in low speed continuous photography, said control means controls the accumulating state of photoelectric information of said image sensor with both the light receiving element output signal and the image sensor output signal.

3. An image sensing device according to claim 1, further comprising means for setting several different frame feeding speeds for continuous photography and wherein in the event of low speed continuous photography for every shot said control means controls the accumulating state of photoelectric information of said image sensor with both the light receiving element output signal and the image sensor output signal.

4. An image sensing device according to claim 1, further comprising: means for varying the charging state of said control means according to indication of selection of said continuous shooting photography mode or said still shooting photography mode.

5. An image sensing device according to claim 4, wherein said means for varying causes said state of charging said control means to be changed to a charging state for said still shooting photography mode upon indication of completion of said continuous shooting photography mode.

6. An image sensing device according to claim 4, wherein there is provided a mechanism for feeding with teeth an exposure limiting member of said control means by energizing an electromagnet at least twice; and clamping means is arranged to push and hold an armature in place during a non-energizing period of time at least after said electromagnet is energized once.

7. An image sensing device, comprising:
(a) an image sensing element for converting an optical image to an image signal;
(b) recording means for recording the image signal converted by the image sensing element;
(c) first light measuring means for forming a first light measuring signal from said image signal;
(d) second light measuring means for forming a second light measuring signal by using a light receiving element arranged separately from the image sensing element; and
(e) control means for controlling the exposure for the image signal of a first shot to be recorded by using both of the first light measuring signal and the second light measuring signal and for controlling the exposure of the image signals of a second shot and subsequent shots, while holding the exposure for the image signal of the first shot unchanged.

8. An image sensing device according to claim 1, wherein the control means is arranged to firstly apply a predetermined first exposure to the image sensing element on the basis of said second light measuring element, to read out the image signal converted by the image sensing element in said predetermined first exposure thereby forming the first light measuring signal, and then to apply a second exposure to the image sensing element on the basis of the second exposure thereby forming the image signal for said first shot to be recorded.

9. An image sensing device according to claim 7, which comprises a memory for storing an exposure condition for said first shot.

10. An image sensing device according to claim 7, further comprising: means for varying the charging state of said control means for controlling the exposure according to indication of whether the shot is said first shot or said second and subsequent shots.

11. An image sensing device according to claim 10, wherein said means for varying causes said state of charging said control means for controlling the exposure to be changed to a charging state for said first shot upon indication of completion of said second and subsequent shots.

12. An image sensing device according to claim 10, wherein there is provided a mechanism for feeding with teeth an exposure limiting member of said control means for controlling the exposure by energizing an electromagnet at least twice; and clamping means is arranged to push and hold an armature in place during a non-energizing period of time at least after said electromagnet is energized once.

* * * * *

UNITED STATES PATENT AND TRADEMARK OFFICE
CERTIFICATE OF CORRECTION

PATENT NO. : 5,012,271

DATED : April 30, 1991

INVENTOR(S) : Akimasa Nishimura et al.

It is certified that error appears in the above-identified patent and that said Letters Patent is hereby corrected as shown below:

Col. 3, line 12. Delete "a" second occurrence

Col. 15, line 49. Change "About" to -- about --

Col. 15, line 4. Change "261d" to -- 261c --

Col. 18, line 36. Change "lines" to -- buses is of course not limited to that number. --

Col. 18, line 37. Before "WRO" insert -- Control lines --

Col. 19, line 21. Change "100 S2" to -- ∅ S2 --

Col. 20, line 25. Delete "when"

Col. 20, line 57. Change "like" to -- as --

Col. 22, line 27. Change "tame" to -- time --

Col. 23, line 8. Delete "in" second occurrence

Col. 23, line 22. Change "of" to -- through --

Col. 24, line 37. Change "claim 1" to -- claim 7 --

Signed and Sealed this

Twenty-ninth Day of September, 1992

Attest:

DOUGLAS B. COMER

Attesting Officer    Acting Commissioner of Patents and Trademarks